(12) United States Patent
Cheng

(10) Patent No.: US 9,778,060 B2
(45) Date of Patent: Oct. 3, 2017

(54) METHOD AND APPARATUS FOR PROVIDING PERSONALIZED ROUTING BASED ON USER ROUTING BEHAVIORS

(71) Applicant: HERE Global B.V., Veldhoven (NL)

(72) Inventor: Wanli Cheng, Seattle, WA (US)

(73) Assignee: HERE Global B.V., Veldhoven (NL)

( * ) Notice: Subject to any disclaimer, the term of this patent is extended or adjusted under 35 U.S.C. 154(b) by 76 days.

(21) Appl. No.: 14/719,891

(22) Filed: May 22, 2015

(65) Prior Publication Data

US 2016/0341564 A1  Nov. 24, 2016

(51) Int. Cl.
*G01C 21/36* (2006.01)
*G01C 21/34* (2006.01)

(52) U.S. Cl.
CPC ..... *G01C 21/3641* (2013.01); *G01C 21/3461* (2013.01); *G01C 21/3484* (2013.01); *G01C 21/3617* (2013.01)

(58) Field of Classification Search
CPC ............... G01C 21/3617; G01C 21/3641
See application file for complete search history.

(56) References Cited

U.S. PATENT DOCUMENTS

| 7,269,504 | B2 | 9/2007 | Gardner et al. | |
| 7,561,965 | B1 | 7/2009 | Nesbitt et al. | |
| 2010/0211304 | A1 | 8/2010 | Hwang et al. | |
| 2014/0188388 | A1 | 7/2014 | Malahy et al. | |
| 2014/0214322 | A1 | 7/2014 | Tsimhoni et al. | |
| 2014/0343839 | A1* | 11/2014 | Lin | G01C 21/3626 701/425 |
| 2015/0260531 | A1* | 9/2015 | Ehsani | G01C 21/3484 701/538 |

OTHER PUBLICATIONS

Patel et al., "Personalizing Routes", UIST '06 Proceedings of the 19th annual ACM symposium on User interface software and technology, Oct. 15-18, 2006, retrieved on Aug. 25, 2015 from https://dub.washington.edu/djangosite/media/papers/uist06.pdf, 4 Pages.

\* cited by examiner

*Primary Examiner* — Todd Melton
(74) *Attorney, Agent, or Firm* — Ditthavong & Steiner, P.C.

(57) ABSTRACT

An approach is provided for determining one or more previous behaviors made by at least one user traveling at least one calculated route. The one or more previous behaviors include, at least in part, one or more deviations from, one or more matches on, or a combination thereof for the at least one calculated route. The approach involves determining one or more predictor values for one or more predictors associated with the one or more previous behaviors. The approach also involves causing, at least in part, a creation of at least one predictive model based, at least in part, on the one or more predictor values. The at least one predictive model is used to predict one or more potential behaviors by the at least one user while traveling the at least one calculated route, at least one other route, or a combination thereof.

20 Claims, 21 Drawing Sheets

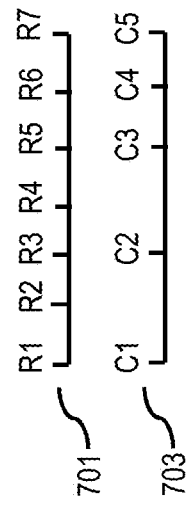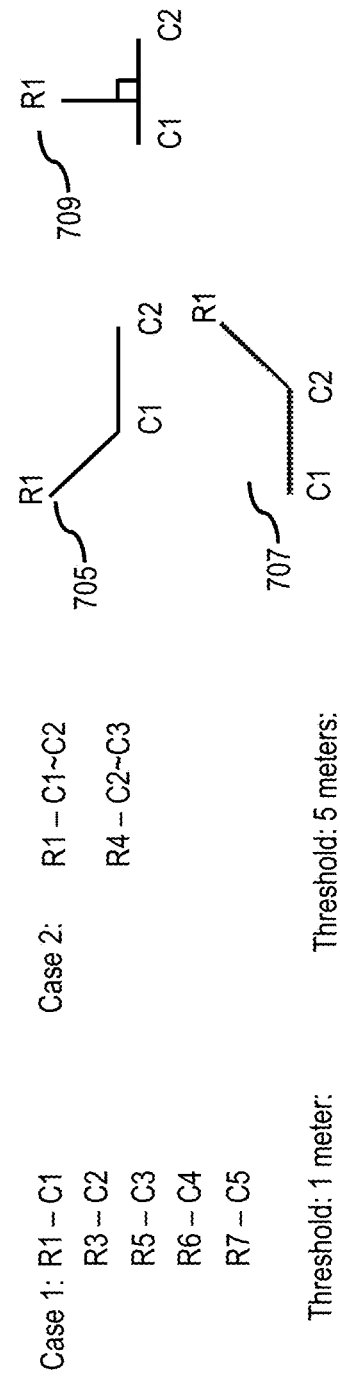
FIG. 7A
FIG. 7B

METHOD AND APPARATUS FOR PROVIDING PERSONALIZED ROUTING BASED ON USER ROUTING BEHAVIORS

BACKGROUND

Service providers and device manufacturers (e.g., wireless, cellular, etc.) are continually challenged to deliver value and convenience to consumers by, for example, providing compelling network services. One area of interest has been the development of navigation systems, applications, and/or other location-based services for providing routing instructions. Traditionally, such navigation systems, applications, and/or services have provided the same instructions for the same route under the same conditions. However, providing the same routing instructions time after time can potentially result in the user ultimately ignoring or otherwise disregarding the instructions, particularly in areas that are already familiar to the user. Accordingly, service providers and device manufacturers face significant technical challenges to enabling the personalization of routing instructions based on when a user is most likely to need or not need routing instructions. For example, a user may be more likely to need routing instructions in areas where the user is likely to make routing mistakes (e.g., taking a wrong turn at a complex intersection), and may be more likely to not need routing instructions when driving in familiar or simple areas or in areas where the user is likely to correctly follow routing instructions (e.g., driving from home to the nearest highway on-ramp).

SOME EXAMPLE EMBODIMENTS

Therefore, there is a need for an approach for providing personalized routing based on potential user routing behaviors (e.g., making routing mistakes, correctly following routing instructions, etc.).

According to one embodiment, a method comprises determining one or more previous behaviors made by at least one user traveling at least one calculated route. The one or more previous behaviors include, at least in part, one or more deviations from, one or more adherences to, or a combination thereof the at least one calculated route. The method also comprises determining one or more predictor values for one or more predictors associated with the one or more previous behaviors. The method further comprises causing, at least in part, a creation of at least one predictive model based, at least in part, on the one or more predictor values. The at least one predictive model is used to predict one or more potential behaviors by the at least one user while traveling the at least one calculated route, at least one other route, or a combination thereof.

According to another embodiment, an apparatus comprises at least one processor, and at least one memory including computer program code, the at least one memory and the computer program code configured to, with the at least one processor, cause, at least in part, the apparatus to determine one or more previous behaviors made by at least one user traveling at least one calculated route. The one or more previous behaviors include, at least in part, one or more deviations from, one or more matches on, or a combination thereof for the at least one calculated route. The apparatus is also caused to determine one or more predictor values for one or more predictors associated with the one or more previous behaviors. The apparatus is further caused to cause, at least in part, a creation of at least one predictive model based, at least in part, on the one or more predictor values. The at least one predictive model is used to predict one or more potential behaviors by the at least one user while traveling the at least one calculated route, at least one other route, or a combination thereof.

According to another embodiment, a computer-readable storage medium carries one or more sequences of one or more instructions which, when executed by one or more processors, cause, at least in part, an apparatus to determine one or more previous behaviors made by at least one user traveling at least one calculated route. The one or more previous behaviors include, at least in part, one or more deviations from, one or more matches on, or a combination thereof for the at least one calculated route. The apparatus is also caused to determine one or more predictor values for one or more predictors associated with the one or more previous behaviors. The apparatus is further caused to cause, at least in part, a creation of at least one predictive model based, at least in part, on the one or more predictor values. The at least one predictive model is used to predict one or more potential behaviors by the at least one user while traveling the at least one calculated route, at least one other route, or a combination thereof.

According to another embodiment, an apparatus comprises means for determining one or more previous behaviors made by at least one user traveling at least one calculated route. The one or more previous behaviors include, at least in part, one or more deviations from, one or more matches on, or a combination thereof for the at least one calculated route. The apparatus also comprises means for determining one or more predictor values for one or more predictors associated with the one or more previous behaviors. The apparatus further comprises means for causing, at least in part, a creation of at least one predictive model based, at least in part, on the one or more predictor values. The at least one predictive model is used to predict one or more potential behaviors by the at least one user while traveling the at least one calculated route, at least one other route, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7C include diagrams illustrating processes for determining deviations from or matches with a route for identifying routing behaviors, according to various embodiments;

DESCRIPTION OF SOME EMBODIMENTS

Examples of a method, apparatus, and computer program for providing personalized routing based on user routing behaviors are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
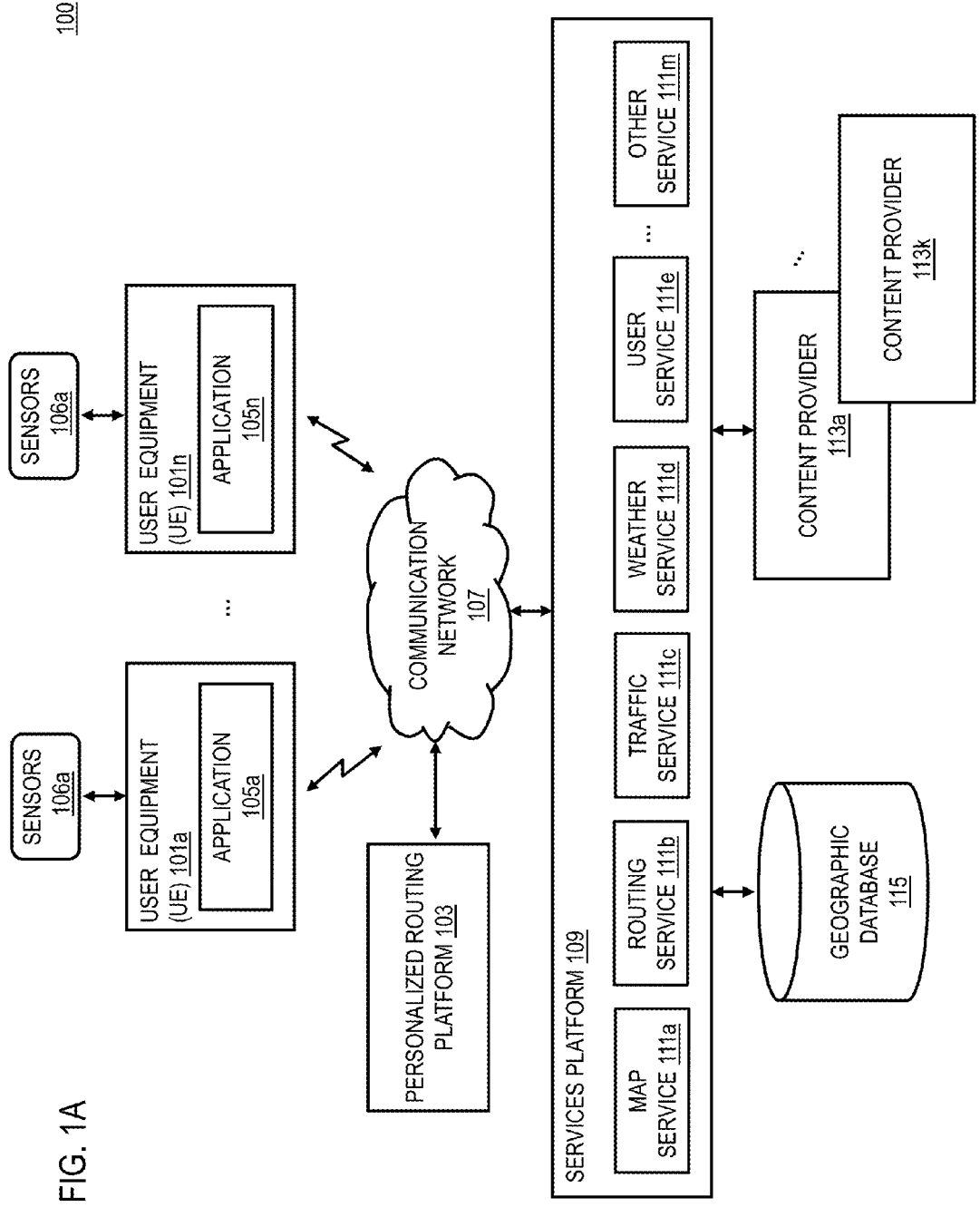
FIG. 1A is a diagram of a system capable of providing personalized routing based on user routing behaviors, according to one embodiment.

FIG. 1A is a diagram of a system capable of providing personalized routing based on user routing behaviors, according to one embodiment. Traditionally, when using a navigation system, users receive the same instructions for the same route regardless of driving behaviors. Often, however, a user may make a routing mistake by missing a turn or turning too early because of absent-mindedness, complex road conditions, insufficient instruction information, errors on the map, heavy traffic flow, bad weather conditions, and other like circumstances. Thus, the navigation instruction may not be sufficient for some users in some cases and, thus, these mistakes may be different for different people at different time with the same navigation instruction. In another circumstance, the user may find the navigation system repetitive, redundant, or annoying because the user is already familiar with the route and would prefer fewer instructions or notifications. Therefore, it may be advantageous to personalize the navigation instruction to anticipate when an individual user may make a navigation mistake or already know well enough about the route. Thus, there may be a way of providing an appropriate amount of instruction and the most opportune times. Thereby, a users' experience may be improved with a more personalized navigation system based on user routing behaviors. As used herein, routing behaviors include, but are not limited to, both negative routing behaviors (e.g., making routing mistakes such as deviating from a calculated route) and positive routing behaviors (e.g., when a user's recorded or actual route matches on or adheres to a calculated route).

To address this problem, a system 100 introduces a capability for providing personalized routing based on user routing behaviors. In one embodiment, the system 100 collects usage data as users actively use routing systems, applications, services, etc. By way of example, the usage data includes recorded and/or calculated routing information as well as characteristics or other parameters associated with the users, environment, route, devices, etc. while engaged in routing. The system 100 can then process the usage data to identify user behavior such as when users make routing mistakes (e.g., a deviation between a recorded route and a calculated route) as well as predictors associated with the mistakes. The system 100 can also identify when users take the correct routes and predictors associated with these correct handlings. In one embodiment, the predictors can be any factor, characteristic, parameter, criterion, etc. that can be associated with or correlated to user routing behaviors. By way of example, predictors include, but are not limited to, complexity, commonality, familiarity, sequence, behavior, traffic, and/or weather. Embodiments and examples of these predictors are discussed in more detail below.

In one embodiment, the system 100 extracts the predictors from the usage data and then determines the weight of each predictor. In one embodiment, the weighting information can be determined with respect to a general population of users, a subset of users, and/or an individual user to provide for varying levels of personalization based on available data.

Based on the extracted predictors and/or weighting information, the system 100 builds a model for predicting user behavior (e.g., when a user is likely to make or not make a routing mistake). As with the processes associated with extraction of the predictor data and determination of the weighting information, the model can be created with respect to a general population of users, a subset of users, and/or an individual user. In one embodiment, the system 100 uses the created model to predict user behavior (e.g., routing mistakes or correct handlings) while routing to personalize routing instructions and/or services to the user based on the predictions.

In this way, the system 100 can personalize routing information based on predicted routing behaviors to provide the user with a personalized amount, timing, frequency, etc. of routing instructions or information. For example, in one embodiment, extra routing information can be provided when a user is about or predicted to make a wrong turn, or a minimum amount of routing information can be provided if the user is behavior indicates that the user can follow the calculated route without a predicted routing mistake. Similarly, if a user is predicted to correctly handle an upcoming route segment (e.g., predicted to match or adhere to a calculated route), the system 100 can reduce the amount of routing information presented to the user.

As shown in FIG. 1A, the system 100 includes one or more user equipment (UEs) 101a-101n (also collectively referred to as UEs 101) with connectivity to a personalized routing platform 103. In addition, the UEs 101 respectively execute one or more navigation applications 105a-105n (also collectively referred to as applications 105) for providing routing and/or other functions discussed with respect to various embodiments of personalized routing based on routing behaviors as described herein. In one embodiment, the UEs 101 and/or the applications 105 communicate with the personalized routing platform 103 and/or other components of the system 100 over a communication network 107. In one embodiment, the applications 105 may perform all or a portion of the functions of the personalized routing platform 103.

In one embodiment, the personalized routing platform 103 interacts with the UEs 101 and/or applications 105 to collect usage data (e.g., a recorded route and/or a calculated route of a user) as described above. For example, when a user is traveling along a travel route, the personalized routing platform 103 may record GPS coordinates that constitute the user's route, along with details regarding the calculated route.

In one embodiment, the personalized routing platform 103 may monitor when a user (e.g., when using a navigation application 105) engages in one or more routing behaviors (e.g., makes one or more routing mistakes or correctly handles a routing segment) using criteria for defining routing behaviors (e.g., by assessing whether deviations are identified between a calculated route and the user's actual recorded route). In one embodiment, a route may be recorded via a mobile device (e.g., UE 101). This information may be communicated to and/or received from the personalized routing platform 103 and/or other UEs 101. As such, the personalized routing platform 103 may build a personalized predictive model based on the identified routing behaviors, and/or other user information to personalize navigation instructions. Thus, the personalized routing platform 103 may collect and analyze user usage data, identify individualized predictor values, and build a model to provide routing instructions or information at appropriate times and appropriate means (e.g., visual alerts, audio alerts, etc.). As previously discussed, a number of predictors may be identified as relevant based on the deviations and utilized, such as complexity, commonality, familiarity, sequence, behavior, traffic, weather, and other like personalized metrics. In one embodiment, after extraction, the predictors may be evaluated, and weighted according to a relative importance (deviations in terms of thresholds, frequencies, etc.) based on one or more user routing behaviors.

In one embodiment, the personalized routing platform 103 may determine previous behaviors made by at least one user traveling at least one calculated route. The initial calculated route might be based in part on previously recorded user routing behaviors, other user behaviors, calculated route information, or a combination thereof. In one scenario, the previous behaviors (e.g., mistakes, correct handlings of route segments, etc.) may be determined by deviations of an actual recorded route of at least one user from the calculated route via the UEs 101. In one embodiment, a deviation above a threshold value or other criteria is determined to be a mistake. However, in some cases, a deviation is not necessarily a mistake. The criteria for determining mistakes may vary in different embodiments. By way of example, a deviation with approximately the same distance as the calculated route may not be a mistake, but a deviation with a loop and substantially longer distance could be a signal that the user made a U-turn in order to come back to the calculated route, thus being a mistake.

In multiple embodiments, the one or more deviations may be categorized and associated with at least one or more predictors. These predictors, in turn, may each be accorded one or more predictor values. In one scenario, this information in conjunction with ground truth factors may be used to construct a predictive model. The predictive model includes a mathematical formula that is able to produce a probability for making one or more potential behaviors by the user while traveling the calculated route, another route, or a combination thereof. In addition or alternatively, each device or UE 101 may configure different mapping or route-based applications (e.g., applications 105a-105n) to display the calculated route information. In this case, the same information will be presented in a format specific to the configured mapping or route-based applications 105.

As shown in FIG. 1A, the system 100 comprises the UEs 101 that may execute or be associated with the applications 105 and sensors 106a-106n (collectively referred to as sensors 106). By way of example, the sensors 106 may include various sensors for determining location and/or geospatial information. For example, the UEs 101 may utilize sensors 106 such as GPS or other satellite-based location receivers for determining geospatial or location information. The sensors 106 may also be used to perform cellular triangulation, assisted-GPS, or other location based techniques for determining the geographic coordinates of a UE 101. In addition, the sensors 110 may be used to gather temporal, spatial or environmental information regarding the UEs 101. By way of example, the sensors may detect speed and location data, tilt data (e.g., a degree of incline or decline of the vehicle along a path of travel), motion data, light data, sound data, image data, weather data and the like.

Still further, the sensors 106 may detect local or transient network and/or wireless signals, such as those transmitted by nearby devices during navigation of a vehicle associated with the user. This may include, for example, network routers as configured within a premise (e.g., home or business) or other UE 101 encountered during navigation to or within range of the point of interest. Other signals detected may include those transmitted by traffic related objects such as traffic lights, traffic cameras, signals, digital signage or the like. It is noted that, in certain implementations, the sensors of the vehicle may be configured to interact with the sensors 106 of the UE 101 for enabling data exchange (e.g., geospatial information exchange) and interaction. This exchange may be facilitated by way of any known or still developing range based or wireless communication protocols.

As noted above, in one embodiment, the personalized routing platform 103 performs the functions associated with providing personalized routing based on user routing behaviors. In one embodiment, the system 100 includes an infrastructure for sharing geospatial information in real-time on multiple devices that includes a map-based service, application, and/or web interface that provides a typical map user interface. By way of example, a map-based service 111a, application, and/or interface can be provided over the communication network 107 by the services platform 109.

In one embodiment, the personalized routing platform 103 may be configured to interface directly with the services platform 109 that provides various services. For example, in addition to the map service 111a (e.g., for providing mapping data and related information), the services platform 109 may include a routing service 111b (e.g., to provide a routing engine for calculating navigation routes), a traffic service 111c (e.g., to provide traffic updates and conditions along a route), a weather service 111d (e.g., to provide weather conditions along a route), a user service 111e (e.g., to enable a user to manage account information, configure personalized preferences, and engage in social interactions with other users), and/or other services 111m (also collectively referred to as services 111). In addition, the personalized routing platform 103 and/or the services platform 109 may interface with one or more content providers 113a-113 (also collectively referred to as content providers 113) that provide/deliver content of various types and genres (e.g., geospatial information, mapping content, navigation content, travel content, locality content, marketing content) upon request. Requests may be initiated via the communication network 107 by way of one or more location based applications 105 executing on the UEs 101 that further associated with respective users. By way of example, the applications 105 may access turn-by-turn navigation, routing information, maps, driving instructions, etc., for accessing, annotating, and/or sharing geospatial information. In one embodiment, the personalized routing platform 103 can store and/or retrieve geospatial information, annotations, and/or other related information in a geographic database 115 (further described below with respect to FIG. 1B). In one embodiment, the services platform 109 and/or any of the services 111 may also have connectivity to the geographic database 115.

In one embodiment, the system 100 includes software to enhance the applications 105, the services 111, the services platform 109, the content providers 113, and/or any other component of the system to enable a user to utilize navigational guidance information based on previously determined user routing behaviors. It is contemplated that the geospatial information need not be associated with a navigational route. Accordingly, in one embodiment, the system 100 can be used to augment (e.g., by automatically communicating to a user) navigational guidance with weather reports, traffic information, and other like information that may be of relevance to a user. In one embodiment, the geospatial information and/or related route are saved on the participating users' UEs 101. In one embodiment, other receiving users may access a user's previous behavioral information. In one embodiment, the system 100 may automatically detect the receiving or participating devices by, e.g., querying for device identifiers, user identifiers, etc. associated with a navigational guidance communication session.

By way of example, navigational information includes, but is not limited to, information related to routes, public spaces (parks, libraries, etc.), geographic areas (towns, boroughs, city blocks, etc.), points-of-interest (restaurants, shopping, etc.), and other like navigational information. Such information may be gathered as navigational information or to supplement preexisting information, and may further include crowd source data, network information, public databases, public information (public transport schedules, etc.), and other like information. In one embodiment, navigational information also may include a number of forms including annotations related to route information, location, logos, visual images, acronyms, and other like forms that may indicate navigational information.

In one embodiment, the weighting information for the one or more predictors is based on personalized data. In one scenario, the previous behaviors made by the at least one user can be quantified as predictor values that correspond to one or more predictors. The predictor values may then be used and compared with one another to generate a weighing for each of the predictors. This may be done using a variety of techniques known in the art, such as by algorithmic techniques. Subsequently, the weighted values may be incorporated into the at least one predictive model used to predict one or more potential behaviors for the at least one user. In one embodiment, the system 100 may receive a request from at least one user to generate a calculated route for a selected destination based on the predictive model. In one scenario, the system 100 may subsequently generate the route by utilizing the predictive model. By so doing, the system 100 may provide navigation guidance information that is personalized for the at least one user. As discussed, the navigation guidance information is personalized by using one or more previous behaviors by the at least one user to provide the navigation guidance at the time deemed effective. In one scenario, furthermore, the system 100 may include the personalization of the navigation guidance information to include varying a type of navigation guidance information, frequency of navigation guidance information, timing for presenting the navigation guidance information, or a combination thereof.

In one embodiment, the system 100 may cause an application of a supervised feature selection mechanism to classify the predictors deemed useful for prediction. The supervised feature selection may include algorithms, such as those based on information gain, to determine whether each predictor is useful. In one embodiment, the system 100 may extract one or more predictors including, but not limited to: a route complexity predictor, a behavior commonality predictor, a route familiarity predictor, a routing sequence predictor, a user behavior predictor, a traffic predictor, a weather predictor. By way of example, these predictors are selected based on their potential to affect navigation behavior and/or information needs. Accordingly, any other predictor that can have the same or similar effect on a user's need for personalized routing instructions or services are also applicable to the various embodiments described herein.

In one embodiment, the complexity predictor is based on how complicated the road or travel characteristics are for a given portion of a route (e.g., how many roads meet at an intersection). In one embodiment, the personalized routing platform 103 can determine multiple values for the complexity predictor by examining road and lane information (e.g., available from the geographic database 115 and/or any other mapping/navigation service 111). For example, when a road or travel segment is complicated, the driver or user may not be able to tell which way to take. Moreover, regarding a shape or configuration of a road or segment (e.g., an intersection), when there are too many branches at the intersection, a verbal description may not be sufficient to explain the right way to take. For instance, regarding travel lanes to use, when only one specific lane among several lanes should be used, it might be more difficult for the driver or user to navigate than when all lanes can be used to make a turn or keep straight.

In one embodiment, the behavior commonality predictor evaluates other driver's mistakes and incorporates the information for a potential prediction. In one embodiment, mass driving history is available from services platform 109 and/or the content provider 113. For example, by looking at other users' routing mistakes, it is possible to find travel segments (e.g., intersections or other complex road features) that can be difficult for drivers to navigate without making mistakes. For instance, at intersections where almost all or a majority of the drivers make routing mistakes, it is also more likely that a new driver will make a mistake at the same location.

In one embodiment, the route familiarity predictor is personalized to each driver to indicate the degree to which a driver is likely to know a given route well. In one embodiment, the personalized routing platform 103 can determine the familiarity predictor for a user by determining whether a given portion or a route is driven frequently and/or recently by the user. By way of example, the personalized routing platform 103, the services platform 109, and/or the content providers 113 may maintain personal driving history information for users to compute the familiarity predictor. For example, if a user has previously traveled a specific segment (e.g., a specific intersection), it is likely that the user already knows the route to take. On the other hand, it is also possible that if the user previously made a mistake at the segment or intersection, then user can make the same mistake when traveling the segment again. Accordingly, the route familiarity predictor can be personalized to each user.

In one embodiment, the routing sequence predictor indicates whether it will be difficult for a user to follow all routing instructions (e.g., a combination of a series of turns) presented in a short period of time along one of the travel segments. For example, if the driver is instructed to make five turns in one minute, it could be an indicator of the difficulty in making all turns correctly; or, if the heading of the vehicle changes a lot during a short amount of time, the driver may be disoriented about where he or she is heading (e.g., north or south). In one embodiment, sequence features are calculated based on previously recorded personal driving history and or real-time sequence features that are captured as the user travels along a route (e.g., a calculated route). In one embodiment, the routing sequence predictor can also be used to predict the probability of a user behavior (e.g., making a routing mistake, correctly handling a route segment, etc.) when there is no driving history information available for a user (e.g., a new driver at a new intersection). In this case, the sequence of upcoming instructions absent driving history information can be a predictor of a particular behavior.

In one embodiment, a user behavior predictor is an indicator of how well a user is traveling (e.g., driving). The behavior predictor can also be determined in real-time and/or from historical data recorded in a user's personal driving history. In one embodiment, real-time behavior features may come from a smartphone application 105 and/or other navigation application/system being operated by a user. For example, a user or driver may not be able to make a safe turn if the vehicle is running at high speed. Additionally, if the route is very long, the user may be exhausted after driving for a few hours—e.g., low vigilance and/or high fatigue levels may contribute to making routing mistakes. Regarding time of day, when it is 10 am in the morning, the driver may be well awake to drive a car; however, when it is 2 am in the morning, the driver may be sleepy and more likely to make mistakes. Any other behavioral factor can also be taken into account if the other factors may contribute to potential driving mistakes. For example, regarding ambient noise level, when there is too much noise in the car (e.g., passengers talking), the driver may not be able to hear the routing instructions.

In one embodiment, the traffic predictor reflects the current traffic conditions for a given travel segment. By way of example, traffic conditions may influence the effectiveness of a particular route and associated routing instructions. In one embodiment, traffic information is available from a network, a website, or other like platforms (e.g., services platform 109). For example, traffic may prevent a user from taking specific routing actions. Traffic flow, for instance, may cause the user's vehicle to have to continue at high speed, and heavy traffic may prevent a user from switching lanes for turns at travel segments such as highway exits or intersections.

In one embodiment, the weather predictor reflects the weather conditions for a give travel segment that may influence driving behavior and/or affect an appropriate amount or type of routing instructions. In one embodiment, weather information is available from a network, a website, or other like platforms (e.g., services platform 109). For example, bad weather may negatively affect a user's ability to navigate a route. For instance, when it is foggy, rainy, or snowy, visibility can be reduced thereby making it harder for the user to see the correct road, lane, etc. to follow routing instructions. Other weather conditions can also affect user performance. For example, low atmospheric pressure or extreme temperatures may reduce a user's cognitive abilities, such as memory.

As previously discussed, the proceeding predictors are provided by way of illustration and not limitation. In one embodiment, the predictors may be assigned predictor values based on the degree and/or frequency of one or more deviations of a recorded route from a calculated route, which is/are the measure(s) of the user's behaviors. In one scenario, the system 100 may use the predictor values associated with the predictors to create at least one predictive model. As discussed, the predictors include, at least in part, a route complexity predictor, a behavior commonality predictor, a route familiarity predictor, a routing sequence predictor, a user behavior predictor, a traffic predictor, a weather predictor, a combination thereof, or other like predictor.

In one embodiment, the system 100 may separate one or more datasets into training data and test data, construct the predictive model from the training data and, further, test the predictive model using the test data. In this way, the predictive model may be directly or iteratively constructed using supervised machine learning algorithms, such as logistic regression and/or support vector machines. In one embodiment, the predictors may or may not be transformed into aggregates or other indicators using statistical procedures (e.g., principal component analysis and/or independent components analysis) before being used to construct the predictive model. In one scenario, the supervised machine learning algorithms may construct the predictive model by classifying routing behaviors into mistakes or correct handlings using predictors with corresponding predictor values, with or without transformation, then further directly or iteratively constructing the predictive model using the training data to predict the mistakes or correct handlings of the test data. In one scenario, the predictive model may be deemed adequate by being designed to predict the test data at accuracy above a threshold. In one embodiment, the system 100 may update the predictive model (as constructed from machine learning, etc.) by determining one or more deviations by comparing at least one recorded route associated with a user against a calculated route. In one scenario, the system 100 may continually repeat this process to update the at least one predictive model.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 105 may be any type of application that is executable at the UE 101, such as communication services (e.g., texting applications, calling applications, etc.), location-based service applications, navigation applications, camera/imaging application, media player applications, social networking applications, calendar applications, and the like. In one embodiment, one of the applications 105 at the UE 101 may act as a client for the personalized routing platform 103 and perform one or more functions of the personalized routing platform 103. In one scenario, users are able to select a destination via one or more map applications. In one embodiment, one or more receivers of the UE 101 may process route information including previous behaviors for presentation at the receiving device.

By way of example, in addition to the sensor types discussed above, the sensors 106, in certain embodiments, may include a camera/imaging sensor for gathering image data, an audio recorder for gathering audio data, a global positioning sensor for gathering location data, a network detection sensor for detecting wireless signals or network data, temporal information and the like for use as annotations. In one embodiment, the sensors 106 may include light sensors, orientation sensors augmented with height sensor and acceleration sensor, tilt sensors, moisture sensors, pressure sensors, audio sensors (e.g., microphone), or receivers for different short-range communications (e.g., Bluetooth, Wi-Fi, etc.). In one scenario, the one or more sensors 106 may detect attributes for mapping or routing (e.g., one or more modes of transportation). In another scenario, the one or more UE 101 may have sensors tuned to detect characteristic aggregates, whereby the sensor data may be calculated either on the cloud or by the UE 101 from the aggregates.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the components of the system 100 communicate with each other and other components using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
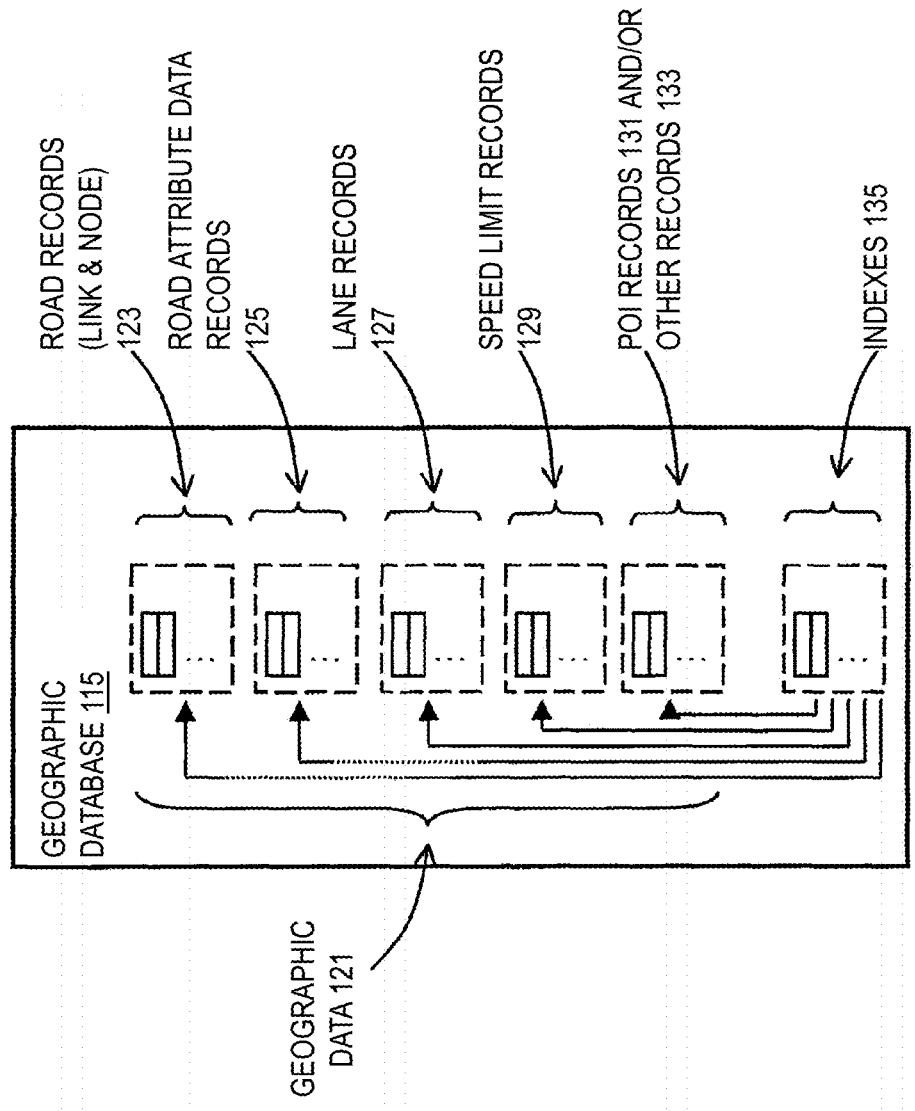
FIG. 1B is a diagram of the geographic database, according to one embodiment.

FIG. 1B is a diagram of the geographic database 115 of system 100, according to exemplary embodiments. In the exemplary embodiments, previous behavioral information, navigational guidance information, and at least one predictive model can be stored, associated with, and/or linked to the geographic database 115 or data thereof. In one embodiment, the geographic or map database 115 includes geographic data 121 used for (or configured to be compiled to be used for) mapping and/or navigation-related services, such as for personalized route determination, personalized annotations, and/or geospatial information sharing, according to exemplary embodiments. For example, the geographic database 115 includes road (link and node) records 123, road attribute data records 125, lane records 127, speed limit records 129, POI data records 131, and other data records 133, for example. More, fewer or different data records can be provided. In one embodiment, the other data records 133 include cartographic ("carto") data records, routing data, and maneuver data.

In one embodiment, information (e.g., components, areas, layers, features, text, and/or symbols) associated with personalized routing information (e.g., navigation instructions), usage data, predictor data, personal driving history, travel profile information, user preferences, and/or the like can be stored in, linked to, and/or associated with one or more of these data records. For example, one or more user behaviors or recorded route information can be matched with respective map or geographic records via position or GPS data associations (such as using known or future map matching or geo-coding techniques), for example.

In exemplary embodiments, the road (link and node) records 123 are links or segments representing roads, streets, or paths, as can be used in the calculated route or recorded route information for determination of one or more personalized predictive models and navigational guidance information based on one or more previous behaviors, according to exemplary embodiments. In one embodiment, the road (link and node) records 123 also include end points corresponding to the respective road links or segments. The road (link and node) records 123 represent a road network, such as used by vehicles, cars, bicycles, and/or other entities. Alternatively, the geographic database 115 can contain path segment and node data records or other data that represent pedestrian paths or areas in addition to or instead of the vehicle road record data, for example.

In one embodiment, the road (link and node) records 123 can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. In one embodiment, these attributes are stored in the road attribute data records 125.

In one embodiment, the geographic database 115 also include information on other characteristics of the road network stored in the road records 123. For example, the geographic database 115 may include lane records to provide lane information for road or travel segments. In one embodiment, the lane information can include a number of lanes, dimensions of the lanes, direction of travel of the lanes, and/or any other lane attributes or characteristics. As another example, the geographic database 115 may include speed limit records 129 that include information related to speed limits for road or travel segments. In one embodiment, speed limit information may include the actual speed limit as well as conditions or criteria for when the limits are applicable. For example, different speed limits can be specified based on time of day, type of vehicle, weather conditions, etc.

In one embodiment, the geographic database 115 can include data about POIs and their respective locations in the POI data records 127. The geographic database 115 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city).

The geographic database 115 can be maintained by the content provider 113 (e.g., a map developer) in association with the services platform 109. The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database 115 or data in the master geographic database 115 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 115 can be a master geographic database, but in alternate embodiments, the geographic database 115 can represent a compiled navigation database that can be used in or with end user devices (e.g., UEs 101) to provided navigation-related functions. For example, the geographic database 115 can be used with the end user device 101 to provide an end user with navigation features. In such a case, the geographic database 115 can be downloaded or stored on the end user device UE 101, such as in applications 105, or the end user device UE 101 can access the geographic database 115 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for ranking of one or more road links.

Figure 2:
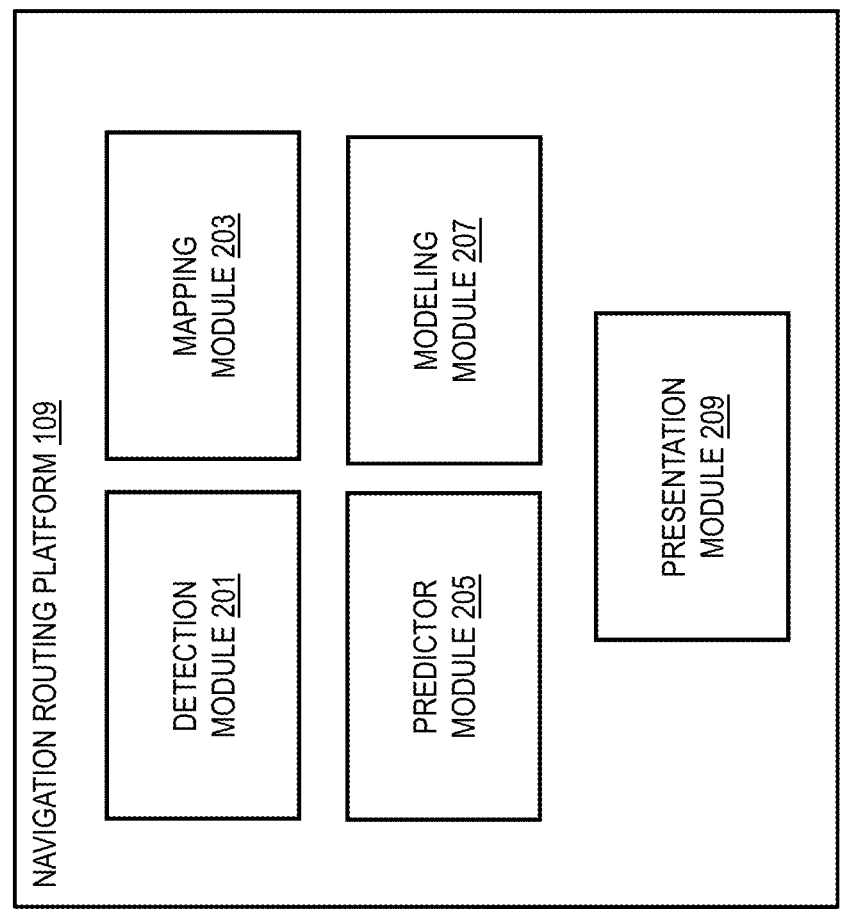
FIG. 2 is a diagram of the components of a personalized routing platform, according to one embodiment.

FIG. 2 is a diagram of the components of a personalized routing platform 103, according to one embodiment. By way of example, the personalized routing platform 103 includes one or more components for providing personalized routing based on user routing behaviors. It is contemplated that the functions of these components may be combined in one or more components or performed by other components of equivalent functionality. In one embodiment, the personalized routing platform 103 includes a detection module 201, a mapping module 203, a predictor module 205, a modeling module 207, and a presentation module 209.

In one embodiment, the detection module 201 includes system algorithms, sensors 106, network databases, and/or one or more third-party content providers, such as content providers 113 for detecting road and lane information for at least one user. The detection module may detect user driving information, contextual information, or a combination thereof. The detection module may communicate with other modules to, at least in part, detect previous behavioral information. The mapping and/or detection (including location information) data can be preprogrammed into the personalized routing platform 103, gathered from crowd source data network, or gathered from at least one sensor or device, and processed via the mapping module 203 and predictor module 205 to determine one or more deviations or matches from the at least one calculated route. This detection module 201 may be further modified with user preferences and tolerances, which, in part, may provide a detection of recorded route information the at least one user.

In one embodiment, the mapping module 203 includes an integrated system for determining navigation information and one or more deviations between a calculated route and a recorded route for at least one user. Such mapping information may be stored in an on-board systems database, gathered from a platform or network, modified manually, accessed when prompted by an application 105, or gathered from devices or sensors incorporated into the detection module 201 and processed via the predictor module 205. The mapping module 203 may also be used to correlate predictors and predictor values with location information to provide appropriate navigation guidance information for the at least one user. This mapping module 203 may be further modified with user preferences and tolerances, which, in part, may provide route information for the at least one user.

In one embodiment, the predictor module 205 may process the outputs of the detection module 201 and mapping module 203 as well as information from other modules for determining one or more predictor values for one or more predictors associated with the one or more previous behaviors. The predictors and predictor values in turn may also be integrated with the detection module 201, the mapping module 203, and modeling module 207 to quantify the previous behavioral information when determining one or more deviations or matches for the at least one calculated route. For instance, the predictor module 205 may output a weighting for one or more predictors based on personalized data gathered from the one or more deviations or matches from the calculated route. These determinations may be constructed based on a manual user input, system setting, or as part of a machine learning algorithm. In one scenario, the predictor module 205 may provide feedback iteratively to the detection module 201, the mapping module 203 or one of the other modules.

In multiple embodiments, the modeling module 207 may process the outputted information of the detection module 201, the mapping module 203, and predictor module 205 to cause the creation of at least one predictive model. The detection module 201 and mapping module 203 assess one or more deviations or matches between a recorded route of a user from the at least one calculated route to, at least in part, determine previous behaviors. Therefore, the personalized routing platform 103 includes a modeling module 207 to evaluate intermediate results from the detection module 201, the mapping module 203, and the predictor module 205 and integrate the information to determine at least one predictive model based on predictor values that may be used to predictor one or more potential mistakes or correct handlings of a user traveling the at least on calculated route. Furthermore, inputted data, algorithms, and process formats may be used to construct supervised machine learning algorithms for each user. Thus, if the model is able to predict mistakes at accuracy above a certain threshold, the model may be saved as part of the user profile. This analysis and construction of the at least one predictive model may be outputted to the presentation module 209 to interface with the at least one user.

In one embodiment, the presentation module 209 may process the outputs of the modeling module 207 as well as information from other modules for a determination if the information reaches a threshold of confidence, and a presentation of the navigation guidance information to a plurality of devices based on the determination. For instance, the presentation module 209 may output navigation guidance information according to the severity and frequency of one or more previous mistakes. Thus, the navigation guidance information may be curtailed for a particular frequency and timing to the at least one user. This navigation guidance information in the form of annotations, audio, video, or a combination thereof may be determined by a manual user input, an automatic determination, or a combination thereof. Also, the presentation module 209 may include an algorithm for a presentation of the calculated route information via one or more mapping applications, one or more mapping user interfaces, or a combination executing respectively on the plurality of devices. In one scenario, the presentation module 209 may provide feedback iteratively to one of the other modules based on user feedback or other system requirements. In another embodiment, the presentation module 209 may cause a presentation of content information in the most suitable manner for a consistent user experience.

Figure 3:
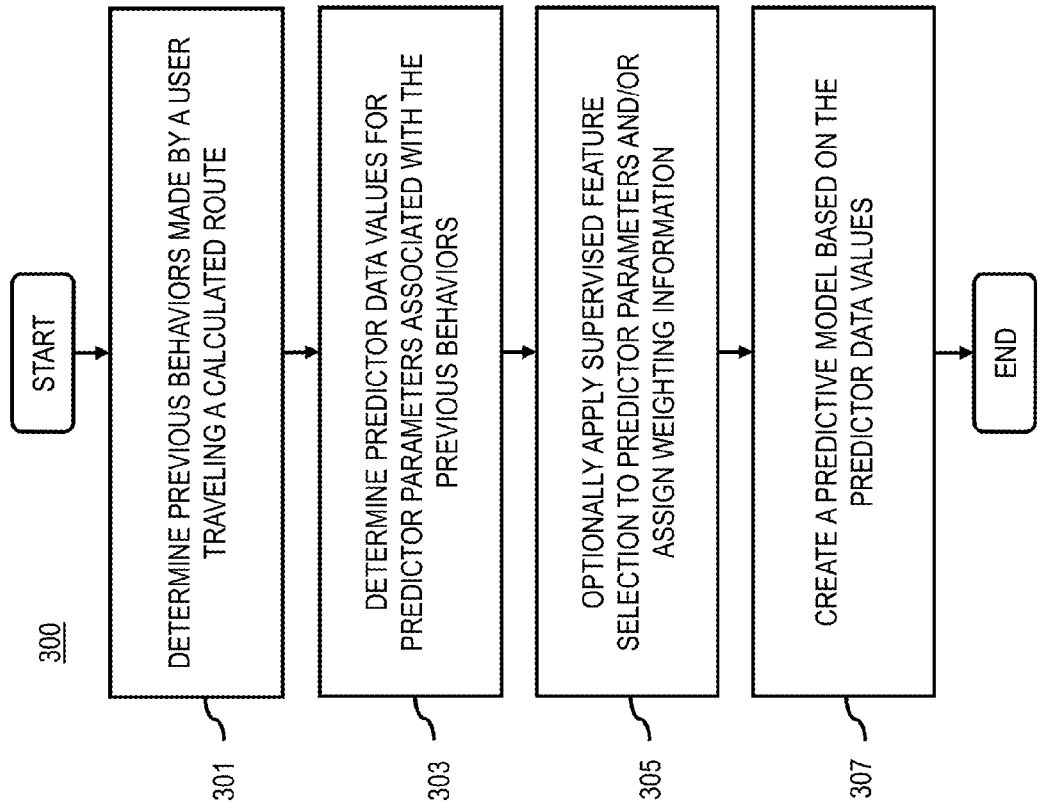
FIG. 3 is a flowchart of a process for creating a predictive model based on user routing behaviors, according to one embodiment.
Figure 10:
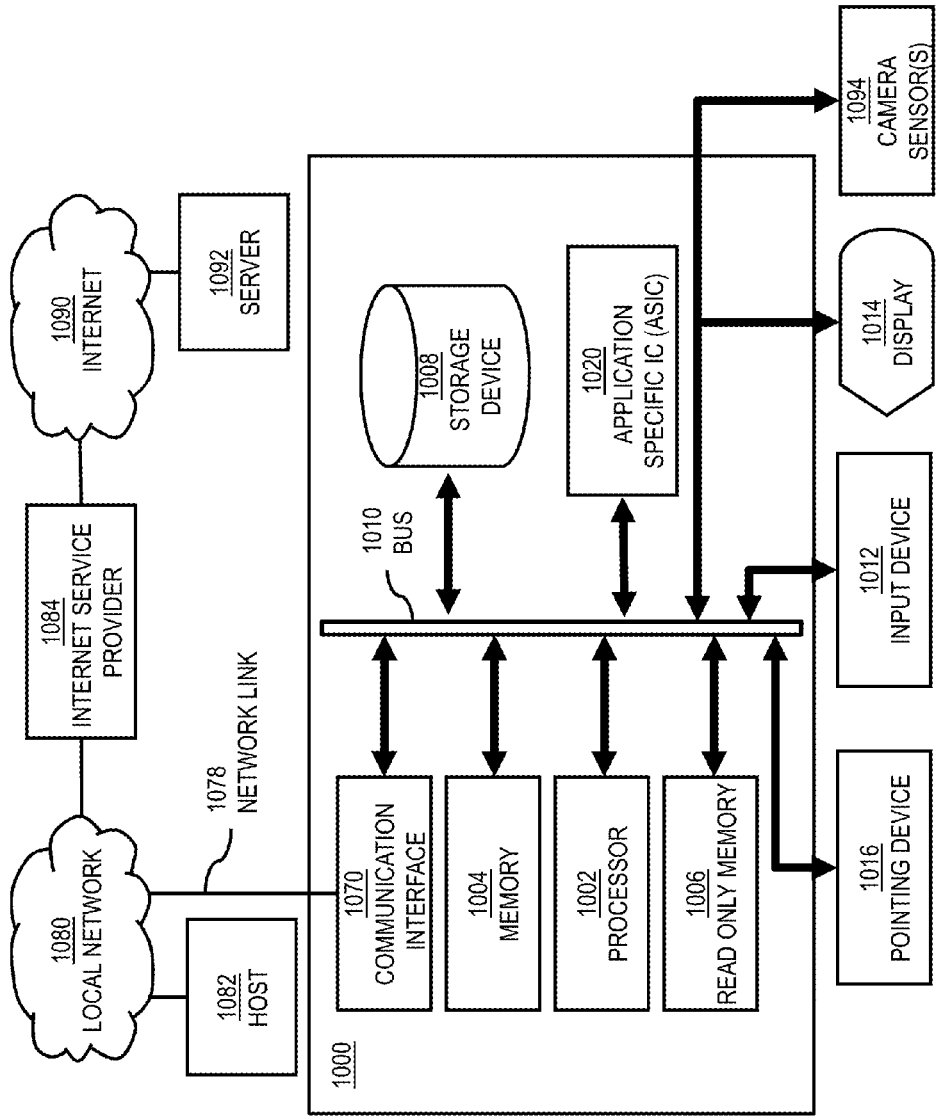
FIG. 10 is a diagram of hardware that can be used to implement an embodiment of the invention.

FIG. 3 is a flowchart of a process for creating a predictive model based on user routing behaviors, according to one embodiment. In one embodiment, the personalized routing platform 103 performs the process 300 and is implemented in, for instance, a chip set including a processor and a memory as shown in FIG. 10.

In step 301, the personalized routing platform 103 determines one or more previous behaviors made by at least one user traveling at least one calculated route. In one embodiment, the previous behaviors (e.g., mistakes or correct handlings) are determined with respect to specific locations or travel segments (e.g., intersections, exits, etc.) along the calculated route. In one embodiment, the previous behaviors serve as training data for various embodiments of the predictive model described herein. For example, to collect training data when a user requests a route from a current location to a destination through a navigation application 105, the personalized routing platform 105 will send back a calculated route together with routing instructions (e.g., turn-by-turn instructions) that has not been personalized. Then, the use will try to follow the instructions to the destination. When a user behavior results in a routing mistake (e.g., a missed turn), the navigation application 105 will make another request for the new route, which is a recalculation from the user's present location to the destination. In one embodiment, this request for recalculation may be used to indicate when a mistake has been made by the user. If a user correctly handles a turn or other navigation maneuver, the personalized routing platform 103 can also log the location of the correct handling and the predictor values associated with the location at the time of the correct handling.

In addition or alternatively, the personalized routing platform 103 can identify a routing mistake (e.g., a previous mistake) without detecting a recalculation by determining when there are one or more deviations from the calculated route. In one embodiment, the personalized routing platform 103 may apply a threshold difference value to determine when a deviation is sufficiently large to indicate a routing mistake. As previously discussed, the personalized routing platform 103 can also use criteria other than deviation to determine whether a behavior is a mistake, a correct handling, etc. For example, the personalized routing platform 103 can use deviation in combination with the presence or absence of other maneuvers (e.g., making a loop, slowing down unexpectedly, etc.) to classify a user routing behavior.

In one embodiment, the personalized routing platform 103 determines the behaviors by processing usage data collected from users when engaged in routing. In one embodiment, the one or more previous behaviors include, at least in part, one or more deviations from, one or more matches on, or a combination thereof for the at least one calculated route, e.g., as indicated by an actual recorded route extracted from the usage data. In one embodiment, the initial calculated route might be based in part on previously recorded user routing behaviors, other user behaviors, calculated route information, or a combination thereof. In one scenario, an identified user behavior may be classified as a mistake or a correct handling by detecting deviations between the recommended or calculated route and the actual recorded route according to predetermined criteria and/or thresholds for the at least one mistake in a recursive manner. Additional discussion of the processes for determining deviations that can be designated as routing mistakes or correct handlings is provided below with respect to FIGS. 7A-7C.

In step 303, the personalized routing platform 103 may determine one or more predictor values for one or more predictors associated with the one or more previous or other identified behaviors. For example, as previously discussed, the personalized routing platform 103 determines the values for the predictors by extracting them from the usage data associated with the identified routing behaviors. For example, the predictors represent measures of road information, the user's driving history, other user's driving histories, traffic flow information, weather information, and the like; and the values for these predictors are the actual measurements for the predictors for a give user or set of users. As previously discussed, in one embodiment, the personalized routing platform 103 can consider any combination of the following predictors: a route complexity predictor, a behavior commonality predictor, a route familiarity predictor, a routing sequence predictor, a user behavior predictor, a traffic predictor, a weather predictor, or a combination thereof.

In one embodiment, the personalized routing platform 103 can determine contextual information about identified routing behaviors (e.g., location, time, concurrent activity, etc.), and then use the contextual information as predictors for extracting or querying for the values for the predictors to associate with the identified behaviors. For example, if a user behavior (e.g., a routing mistake or a correct handling) is determined at a particular intersection, the personalized routing platform 103 can query mapping information for road and lane information to determine a route complexity for that intersection (e.g., how many roads meet at the intersection, distances between roads, etc.). The personalized routing platform 103 can then similarly determine values for other predictors for the identified mistake at the intersection. For example, the personalized routing platform 103 can query a driving history database to determine a mistake or behavior commonality and a route familiarity. As previously discussed, the values for the predictors can also be extracted from collected usage data.

In one embodiment, once routing behaviors have been determined at specific locations (e.g., extracted from training data as described above), and predictors (e.g., specific values for predictors) of these behaviors are extracted, the personalized routing platform 103 optionally can apply supervised feature selection (e.g., algorithms based on information gain) to determine whether each predictor is useful for prediction of routing behaviors (step 305) and then assign weighting information based on the supervised feature selection. In one embodiment, the usefulness of prediction can be determined with respect to an individual user and/or a set of users. For example, in an example of determining usefulness for a route complexity predictor, if the personalized routing platform 103 determines that a travel segment or road feature (e.g., a fork, a crossroad, an intersection, etc.) with five or more arms are associated with the same probability of mistakes as less complicated road features, then the route complexity predictor is not likely to be a useful or effective predictor for routing mistakes. Conversely, if a road feature with five or more arms is associated with a significantly higher probability of mistakes, then the route complexity predictor can potentially be a useful or effective predictor of routing mistakes.

In one embodiment, the weighting information for predictors (e.g., all predictors or just predictors resulting supervised feature selection) can be determined. For example, the personalized routing platform 103 can further personalize the predictive model by determining weighting information for the one or more predictors based, at least in part, on personalized data (e.g., the personalized data discussed above with respect to step 301). As previously discussed, these predictors are measures of road information, the user's driving history, other users' driving history, traffic flow information, and weather information (e.g., a route complexity predictor, a behavior commonality predictor, a route familiarity predictor, a routing sequence predictor, a user behavior predictor, a traffic predictor, a weather predictor, or a combination thereof). In various embodiments, the predictors may be extracted, and weighted according to a relative importance (deviations in terms of thresholds, frequencies, etc.) of their effectiveness at predicting user routing mistakes. For example, if usage data indicates that the route complexity predictor is more highly correlated with user routing mistakes (e.g., by being associated with a higher probability of user routing mistakes), then the route complexity predictor can be more heavily weighted than another predictor that is less correlated with a user routing mistakes. By way of example, these techniques may be performed using means known in the art, such as by algorithmic techniques.

In one embodiment, with a dataset of ground truths (e.g., identified mistakes), predictors and associated values, the personalized routing platform 103 can split the dataset into training and test parts. In one embodiment, if the optional supervised feature selection mechanism is applied, the set of predictors will include those predictors that have been classified as useful or effective for predicting routing behaviors. The personalized routing platform 103, for instance, can then apply supervised machine learning algorithms (e.g., logistic regression, support vector machines, etc.) to build the at least one predictive model. It is noted that the supervised feature selection mechanism is one example of optional data processing steps that the personalized routing platform 103 can perform as part predicting user behavior for personalizing routing information. Other examples (e.g., weighting) are described below with respect to FIG. 4.

In step 307, the personalized routing platform 103 causes, at least in part, a creation of at least one predictive model based, at least in part, on the one or more predictor values. In one embodiment, the at least one predictive model is used to predict one or more potential behaviors by the at least one user while traveling the at least one calculated route, at least one other route, or a combination thereof.

In one embodiment, the level of personalization of the created predictive model can depend on the level of personalization of the underlying user data. For example if the underlying data is collected from a population of user rather than an individual user, the predictive model can be personalized to the population instead of the individual. Accordingly, in one embodiment, the personalized routing platform 103 causes, at least in part, a personalization of the at least one predictive model to the at least one user based, at least in part, on personalized data, when the one or more predictor values and/or the collected usage data used for building the predictive model include personalized data. In one embodiment, the collected usage data used by the personalized platform 103 can be collected from a general population of users, a subset of users, or an individual user. When the usage data is collected from an individual user (e.g., either individually or when the user is part of the subset or the general population of users), the usage data contains personalized data with respect to the individual user. In this case, the personalized routing platform 103 can further personalized the predictive model, predictors, values for the predictors, or a combination thereof using the personalized data.

Figure 4:
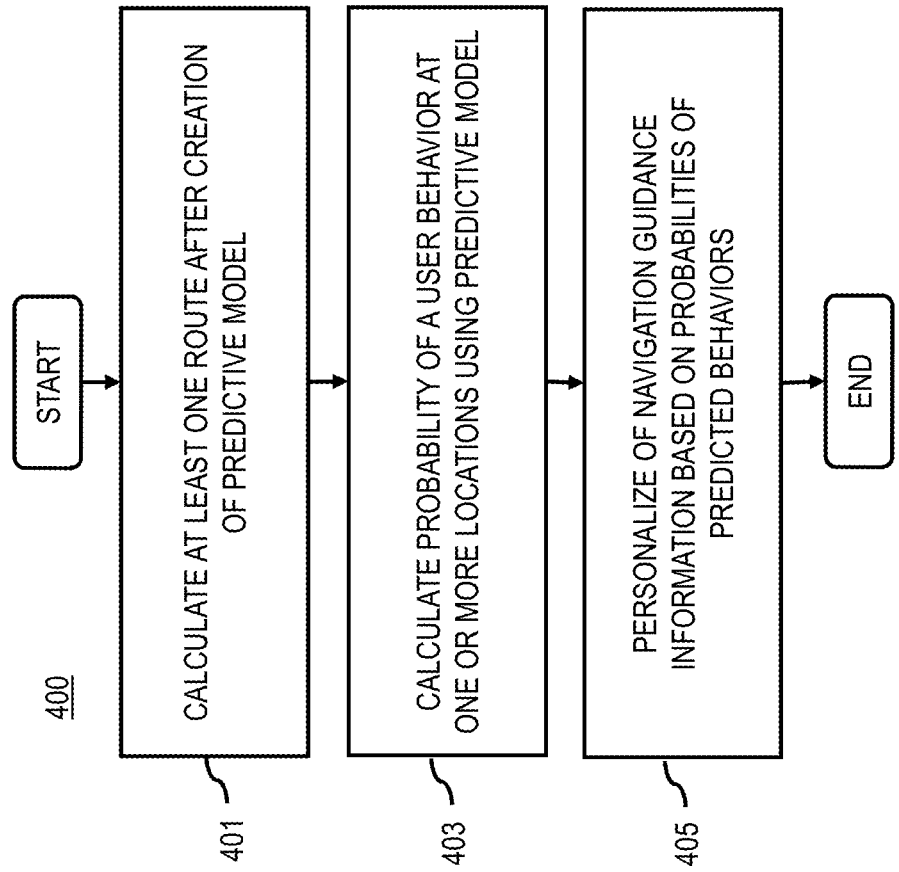
FIG. 4 is a flowchart of a process for using a model to predict routing behaviors to provide personalized routing, according to one embodiment.

FIG. 4 is a flowchart of a process for using a model to predict routing mistakes to provide personalized routing, according to one embodiment. In one embodiment, the personalized routing platform 103 performs the process 400 and is implemented in, for instance, a chip set including a processor and a memory as shown in FIG. 10. In one embodiment, the steps of the process 400 are optional steps that can be performed in combination with one or more steps of the process 300 of FIG. 3.

In step 401, the personalized routing platform 103 receives a request by the at least one user to generate at least one personalized calculated route. For example, the request can be initiated via an application 105, service 111, navigation system, etc. by the user. In one embodiment, the route is termed a "personalized" calculated route because the generation of the calculated route is based on the information from a predictive model that is associated with the at least one user. In one embodiment, the personalized routing platform 103 can generate the personalized calculated route using any routing algorithm of a routing service, platform, application, etc. (e.g., provided by the services platform 109 and/or natively by a routing engine of the personalized routing platform 103 and/or applications 105).

In step 403, the personalized routing platform 103 processes and/or facilitates a processing of the at least one personalized calculated route using the at least one predictive model to determine one or more predicted user behaviors (e.g., routing mistakes, correct handlings, etc.) for the at least one user while traveling the at least one personalized calculated route. For example, the personalized routing platform 103 can use the predictive model to calculate a probability of one or more user behaviors occurring at one or more locations along a calculated route. In one example use case, the personalized routing platform 103 can be configured to predict user behaviors (e.g., probability of a routing mistake and/or a correct handling) at traditional notification or decisions points along a calculated route (e.g., at intersections, exits, entrances, etc.).

More specifically, in one embodiment, the personalized routing platform 103 can assess the applicable predictors against various locations along the calculated route using the predictive model to determine which locations or segments (e.g., intersections, exits, etc.) along the calculated route are likely to be associated with specific behaviors (e.g., likely to result in the user making a routing mistake). For example, if the predictive model indicates a correlation between an intersection with high complexity (e.g., greater than five arms or branches), high traffic flows, and bad weather and a high probability of the user making a routing mistake, the personalized routing platform 103 can search for locations with predictor values matching that use case to identify potential locations for routing mistakes. In one embodiment, the personalized routing platform 103 can predict user behaviors (e.g., mistakes or correct handlings) before the user actually travels the calculated or predict behaviors in real time as the route is traveled.

In step 405, the personalized routing platform 103 causes, at least in part, a personalization of navigation guidance information to present to the at least one user while traveling the at least one personalized calculated route based, at least in part, on the one or more predicted behaviors (e.g., the calculated probabilities of the predicted behaviors). In one embodiment, the personalization of the navigation guidance information includes, at least part, varying a type of the navigation guidance information, a frequency of the navigation guidance information, timing for presenting the navigation guidance information, or a combination thereof, for instance, based on the predicted behavior. In one embodiment, the type or form of personalization of the navigation guidance information (e.g., routing instructions) can be determined so that it helps to minimize the probability that the user will engage the predicted negative routing behavior. For example, at a complex intersection where a routing mistake is predicted, the personalized routing platform 103 can present a combination of visual, audio, and textual instructions at greater frequencies near the intersection.

Figure 5:
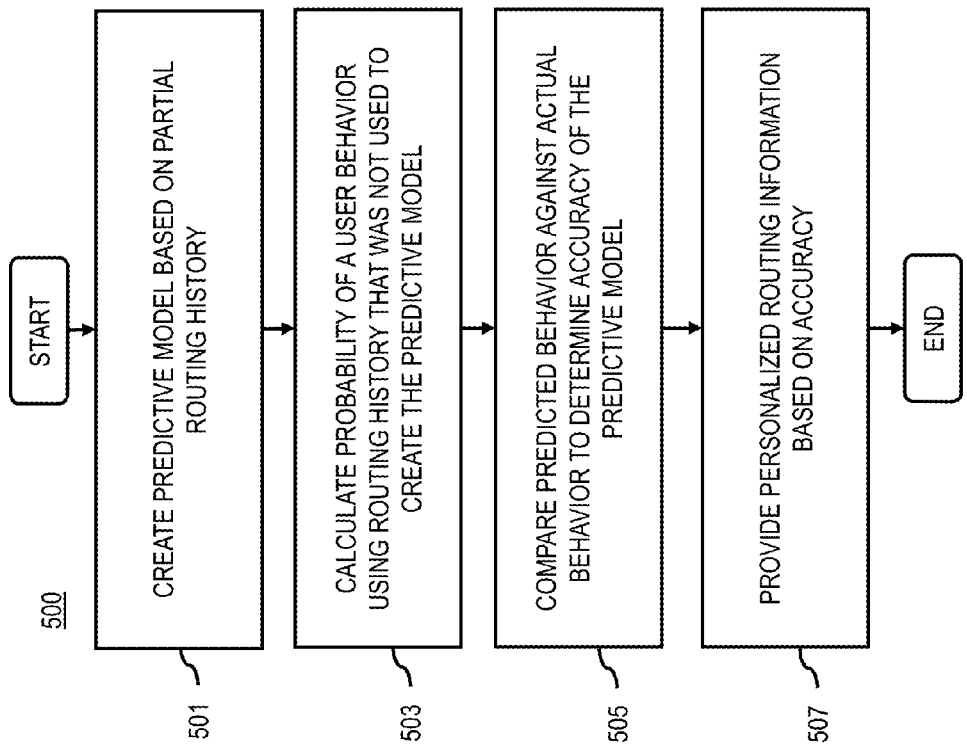
FIG. 5 is a flowchart of a process for validating a predictive model for providing personalized routing based on user routing behaviors, according to one embodiment.

FIG. 5 is a flowchart of a process for validating a predictive model for providing personalized routing based on user routing behaviors, according to one embodiment. In one embodiment, the personalized routing platform 103 performs the process 500 and is implemented in, for instance, a chip set including a processor and a memory as shown in FIG. 10.

In one embodiment, to validate a predictive model, the personalized routing platform 103 can split a dataset (e.g., routing history data) into a training portion and a test portion. In one embodiment, the predictive accuracy information is calculated without personalized navigation turned on. The personalized routing platform 103 can then record actual route data and calculated route data along with associated predictor values as the dataset. It is contemplated that the personalized routing platform 103 can use any process or mechanism to split the dataset (e.g., non-discriminate splitting, discriminate splitting based on predetermined criteria, etc.).

In step 501, the personalized routing platform 103 creates a predictive model using the training portion of the dataset (e.g., according to various embodiments of the model creation processes described above). In one embodiment, supervised machine learning algorithms may construct the predictive model by cataloguing previous behaviors as predictors with corresponding predictor values. Then, in step 503, the personalized routing platform 103 uses the test portion of the dataset (e.g., the portion of the dataset not used to create the predictive model) to calculating probabilities of user behaviors at various locations along a route indicated in the dataset. For example, the locations can be points where users are traditionally provided routing information (e.g., at intersections, exits, entrances, etc.).

Alternatively, the personalized routing platform 103 may use cross validation techniques to calculate probabilities. In one embodiment, the personalized routing platform 103 can arbitrarily or randomly split a dataset (e.g., routing history data) into 10 pieces. Then, in step 503, the personalized routing platform 103 uses 1 piece as the test portion and the other 9 pieces at the training portion. Since there are 10 possible permutations in this process (e.g., each of the 10 pieces can be used as the test portion), it is also called 10-fold cross validation.

In step 505, the personalized routing platform 103 determines predictive accuracy information for the predictive model. For example, the personalized routing platform 103 can determine the predictive accuracy information based on whether predicted behaviors (e.g., predicted in step 503 above) match actual routing mistakes indicated in the dataset. In one embodiment, the accuracy can be computed for all or a subset of predicted mistakes for one or more recorded routes. Moreover, in one embodiment, the accuracy information can be specific to a single user, a general population of users, or a subset of users. Alternatively, in one embodiment, the accuracy information can include a mean of 10 values for a 10-fold cross validation. In one embodiment, the personalized routing platform 103 can iteratively construct the predictive model using the training data to predict the mistakes of the test data as new data is collected.

In step 507, the personalized routing platform 103 provides personalized routing information using the predictive model based on the calculated accuracy information (e.g., based on whether the calculated accuracy of the predictive meets a threshold value). In one embodiment, the personalized routing platform 103 also may cause an association of the predictive model with at least one profile of the at least one user if the predictive accuracy information is above at least one threshold value.

Figure 6:
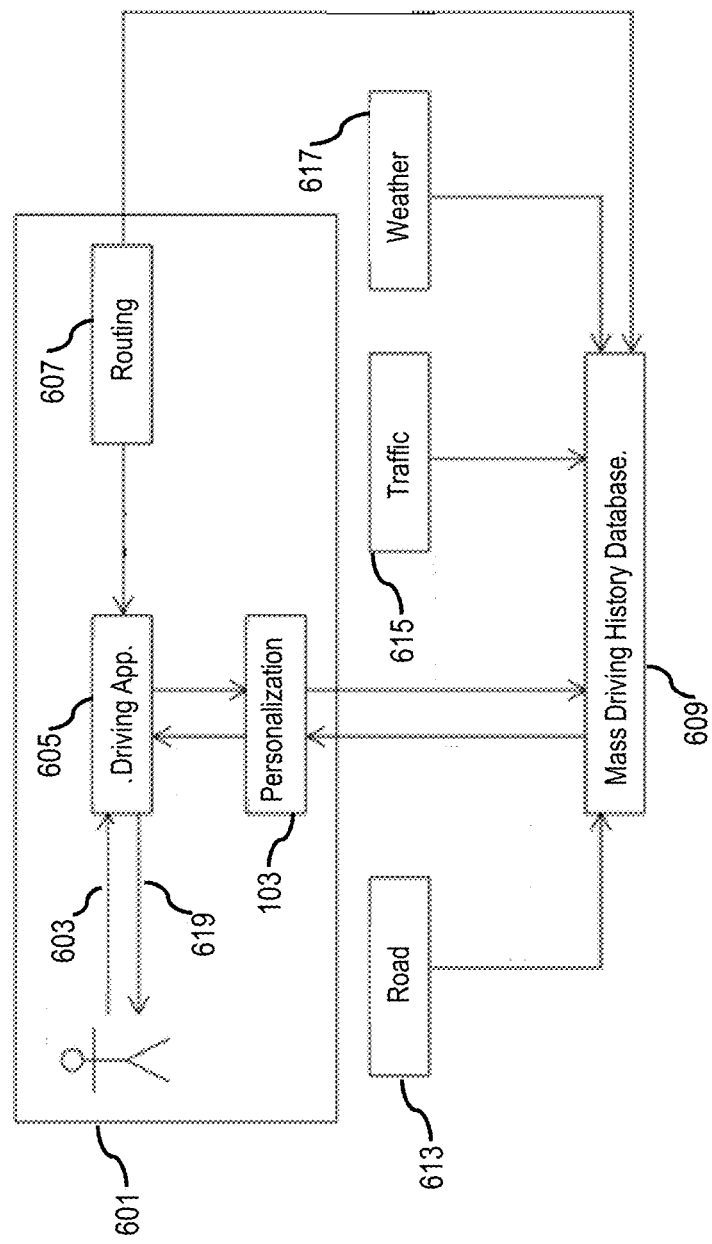
FIG. 6 is a diagram of the integration predictors for personalized routing, according to one embodiment.

FIG. 6 includes a diagram utilized in the processes of FIG. 3-5, according to one embodiment. In one embodiment, a personalized routing system 600 provides personalized instructions to the user according to the user's previous behaviors on the road. In one embodiment, a sub-system 601 is able to run offline after collecting essential information from other online systems (e.g., building a predictive model with the information from the mass driving history database 609). The system 601 records driving history 603 from the user in a driving application 605. The system takes the recorded route, which is the actual route taken by the user (e.g., from the driving application 605), as a basis, and compares it to the calculated route, which is the suggested route from the routing platform 607. In one embodiment, if the recorded route deviates from the calculated route by one or more thresholds, the behavior is considered to be a mistake. Conversely, if the recorded route matches (e.g., does not deviate from) the calculate route or does not meet criteria for determining a mistake, the behavior can be classified as a correct handling. The system may exchange routing behavior information with the mass driving history database 609.

An example use of the system of FIG. 6, may include a set of ground truth (actual personal driving routes) and a subset of the predictors with associated values, the dataset will be split into training and test parts, and supervised machine learning algorithms (such as logistic regression and/or support vector machines) will be used to build a model for each user based on the training data and test the model on the test data. If the model is able to successfully predict behaviors (e.g., mistakes, correct handlings, etc.) at an accuracy above a certain threshold, the model will be saved as part of the user profile into the personalized routing platform 103.

In one embodiment, a road service 613 includes road and lane information, and other mapping details. In addition, a traffic service 615 and a weather service 617 provide real-time and/or historical traffic and weather information, respectively, to be integrated with personalized routing information determined by the personalized routing platform 103. In one embodiment, the personalized routing platform 103 returns the personalized routing information to the driving application 105 which then presents personalized navigation guidance information 619 to the user based on the predictive model described.

Figure 7C:
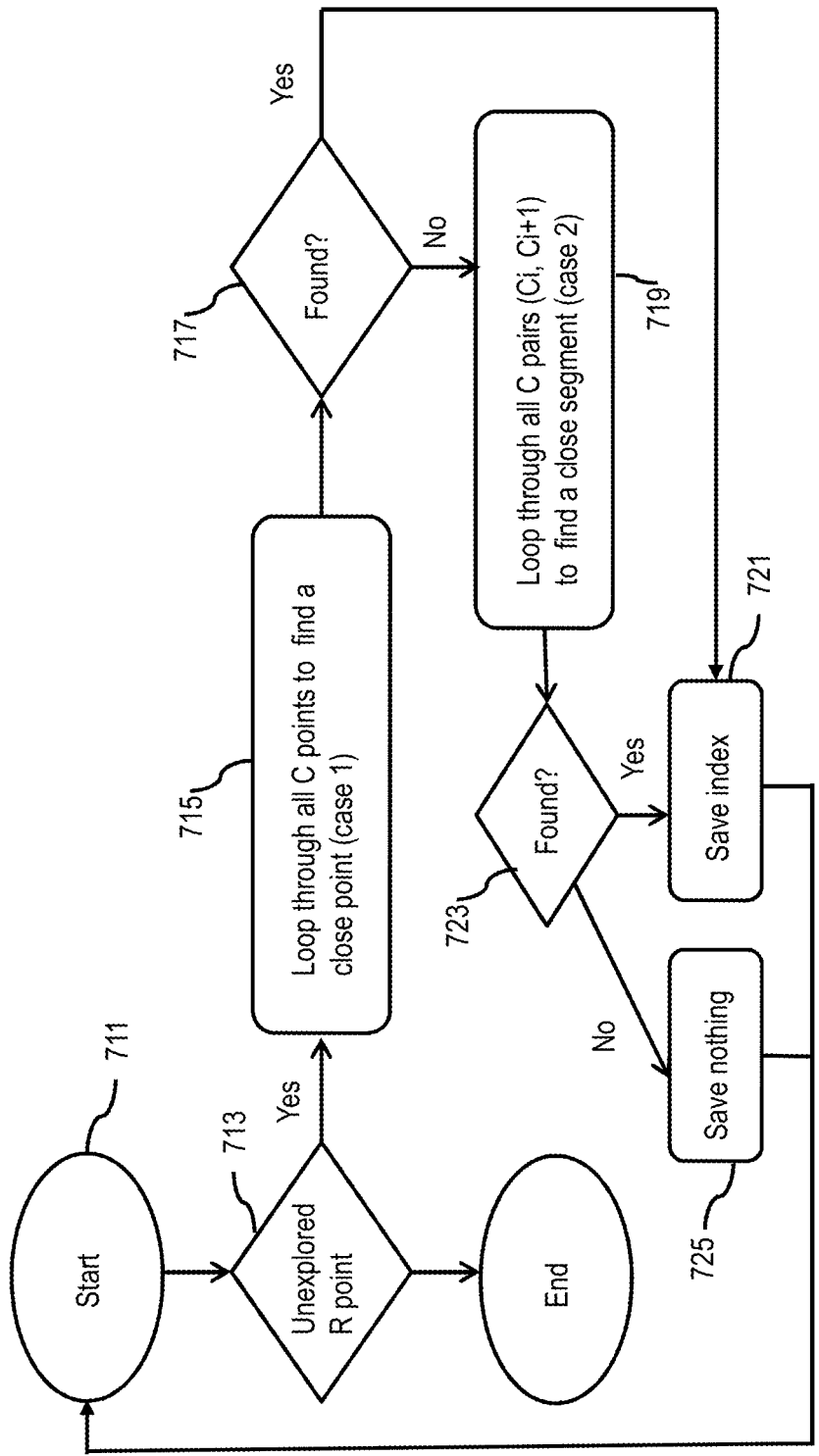

FIGS. 7A-7C include diagrams illustrating processes for determining deviations from or matches with a route for identifying routing behaviors, according to various embodiments. The processes of FIGS. 7A-7C are provided as example processes and are not intended as limitations. It is contemplated that any other algorithm for determining deviations or matches with respect to a calculated route can be used. For example, k-dimensional trees can used to analyze this dataset for route deviations or matches.

As shown, the algorithm of FIG. 7A may compare a recorded route (R) (701) including points R1 to R7 and a calculated route (C) (703) including points C1 to C5 to determine one or more deviations, one or more matches, or a combination thereof between the two routes. The system may determine the deviations and/or matches using any means known in the art. In FIG. 7B, the algorithm may determine whether one or more points of the calculated route are within a threshold distance from the recorded route. Such means may include looping through all C points to find a close point (case 1), and/or looping through all C pairs (Ci, Ci+1) using a greater threshold to find a close segment (case 2). Case 2 may involve determining whether a recorded point (R1, R4, etc.) is within a threshold distance from a segment including calculated points (C1~C2, C2~C3, etc.). For example, the distance between the recorded point (R1)

and the segment (C1~C2) may include a determination of the distance from the recorded point (R1) to calculated point one (C1) (705), calculated point two (C2) (707), and/or a part of the segment formed by the calculated points (C1~C2) (709). In one scenario, the system may use multiple techniques to determine whether one or more points of a recorded route are within a threshold of a calculated route. In FIG. 7C (711), one or more algorithms may determine whether a recorded point (R) (713) is on the calculated route (715). If the point is found using the scenario of case 1 (717), the correspondence between the recorded point (R) and the calculated point (C) may be saved (721); if no point (C) is within a threshold distance, an algorithm may be used to find a paired entity (719) of the calculated points (C) that are within a threshold distance to a recorded point (R). For this second case, the correspondence may be found (723) and saved. If the correspondence is not found, nothing is saved (725). Thus, this recorded point (R) may be identified as part of a deviation from the calculated route.

FIGS. 8A-8G includes diagrams for utilizing an algorithm to calculate the predictor values for specific predictors in the processes of FIG. 3-5, according to various embodiments. The diagram includes seven algorithms (801, 821, 833, 843, 853, 865, 873) for evaluating the predictors of Complexity, Commonality, Familiarity, Sequence, Behavior, Traffic, and Weather, respectively. For example, Complexity (801), Commonality (821), Familiarity (833), Sequence (843), Behavior (853), Traffic (865), and Weather (873) may include a retrieval of GPS coordinates from the a mass driving history database, a processing of GPS data in conjunction with algorithmic processing, and a calculation of one or more predictive values for each of the predictors, respectively. Finally, the relevant predictors in conjunction with predictor values are saved for the predictive model and/or future reference.

Figure 8A:
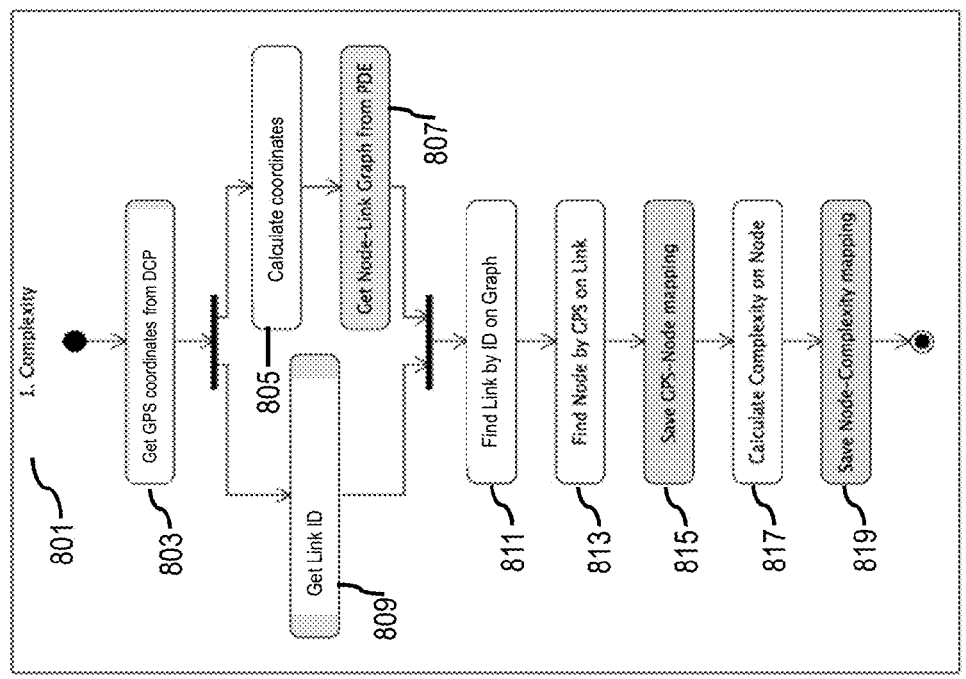
FIGS. 8A-8G includes diagrams for utilizing an algorithm to compare a recorded route to a calculated route used in the processes of FIG. 3-5, according to various embodiments.

FIG. 8A may include an algorithm for comparing a recorded route to a calculated route for Complexity (801) including first retrieving GPS coordinates (803) from a mass driving history database. Then, a number of processes may be implemented including calculating coordinates (805), getting Node-Link Graph from a geographic database 115 (807), and retrieving a Link ID (809). Then, a Link may be found by the Link ID on the Graph (811), the Node found by GPS on Link, (813) and the GPS-Node mapping may be saved (815). Furthermore, the Complexity calculations may be performed on the Node (817) and the Node-Complexity mapping may be saved (819).

Figure 8B:
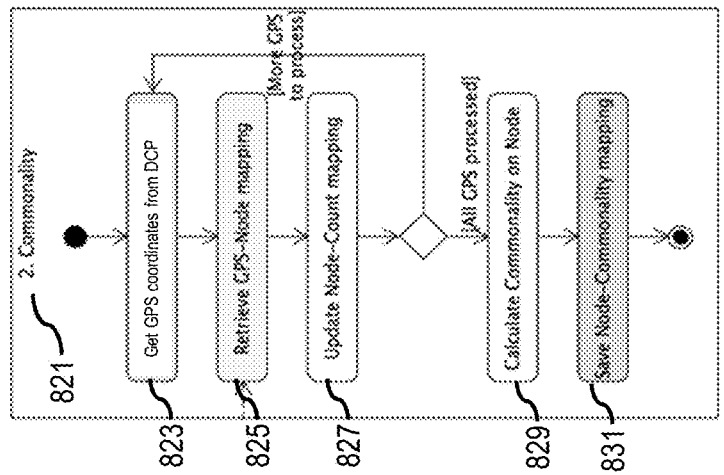

The FIG. 8B algorithm for comparing a recorded route to a calculated route for Commonality (821) includes first retrieving GPS coordinates from a mass driving history database (823). Then, a number of processes may be implemented including retrieving GPS-Node mapping (825) and updating Node-Count mapping (827) along with processing more GPS data (833). Once the GPS data is processed the Commonality calculations may be performed on the Node (829) and the Node-Commonality mapping may be saved (831).

Figure 8C:
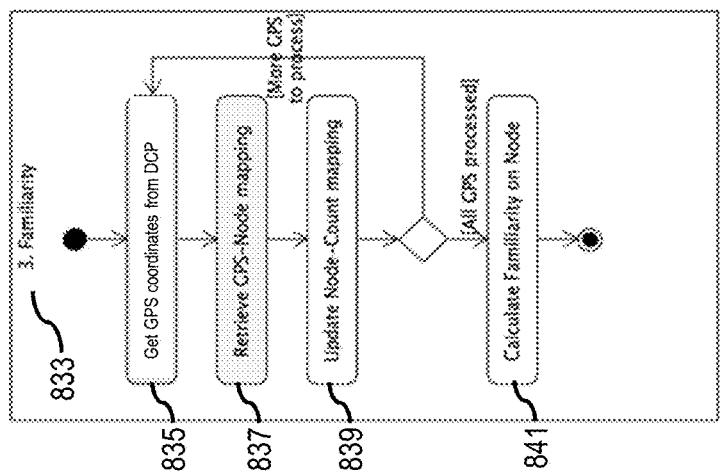

The FIG. 8C algorithm for comparing a recorded route to a calculated route for Familiarity (833) includes first retrieving GPS coordinates from a mass driving history database (835). Then a number of processes may be implemented including retrieving GPS-Node mapping (837) and updating Node-Count mapping (839) along with processing more GPS data (837). Once the GPS data is processed the Familiarity calculations may be performed on the Node (841) and the Node-Commonality mapping may be saved.

Figure 8D:
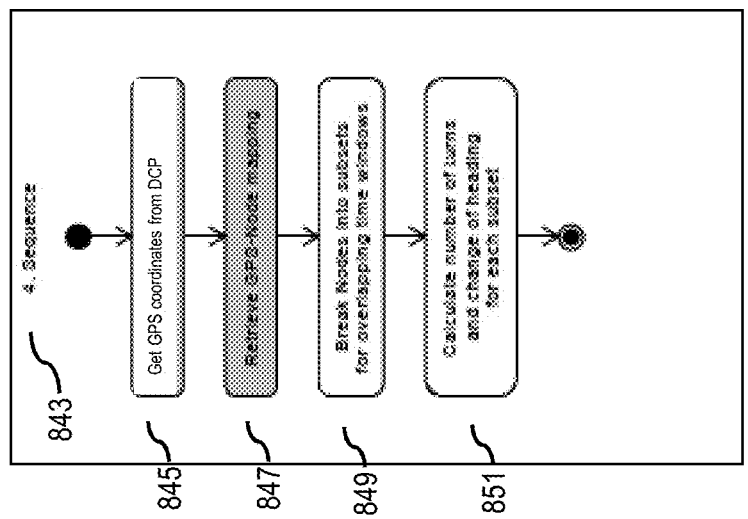

The FIG. 8D algorithm for comparing a recorded route to a calculated route for Sequence (843) includes first retrieving GPS coordinates from a mass driving history database (845). Then a number of processes may be implemented including retrieving GPS-Node mapping (847) and breaking Nodes into subsets for overlapping time windows (849) along with calculating the number of turn and change of heading for each subset (851). Once the data is processed the Sequence calculations may be performed and saved.

Figure 8E:
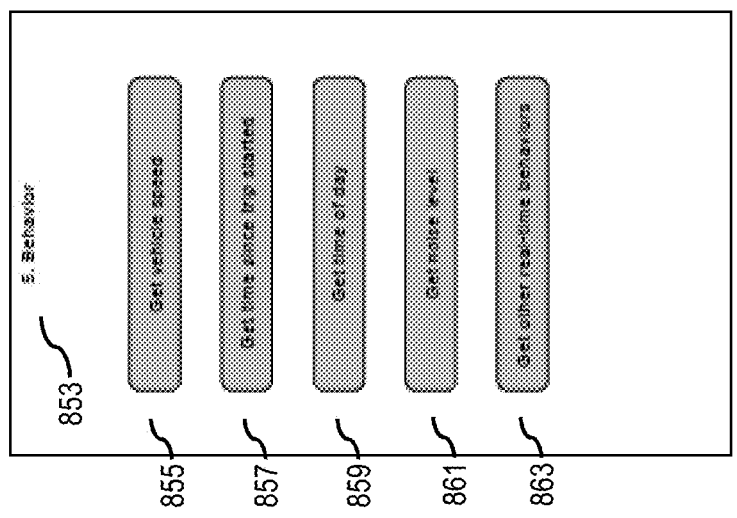

The FIG. 8E algorithm for comparing a recorded route to a calculated route for Behavior (853) includes multiple aspects including retrieving the vehicle speed (855) and the time elapsed since the start of the trip (857). Also, other aspects may be processed including time of day (859), noise level (861), real-time behaviors (863), and other like factors. Once the data is processed the Behavior calculations may be performed and saved.

Figure 8F:
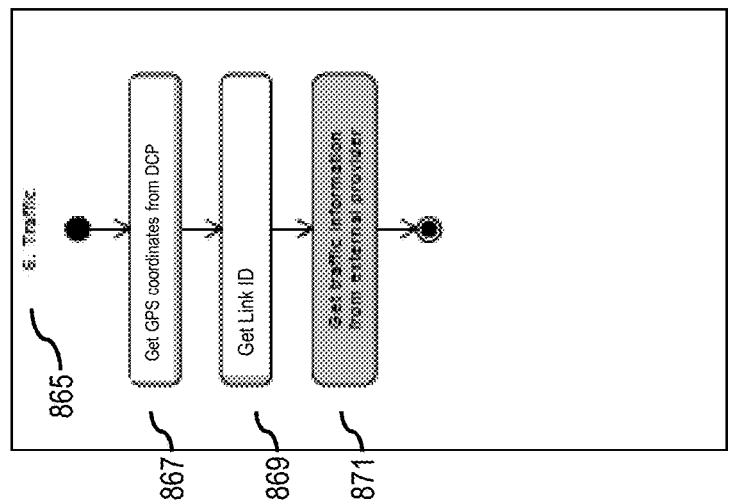

The FIG. 8F algorithm for comparing a recorded route to a calculated route for Traffic (865) includes first retrieving GPS coordinates from a mass driving history database (867). Then a number of processes may be implemented including retrieving a Link ID (869) and traffic information from an external provider (871). Once the data is processed the Traffic calculations may be performed and saved.

Figure 8G:
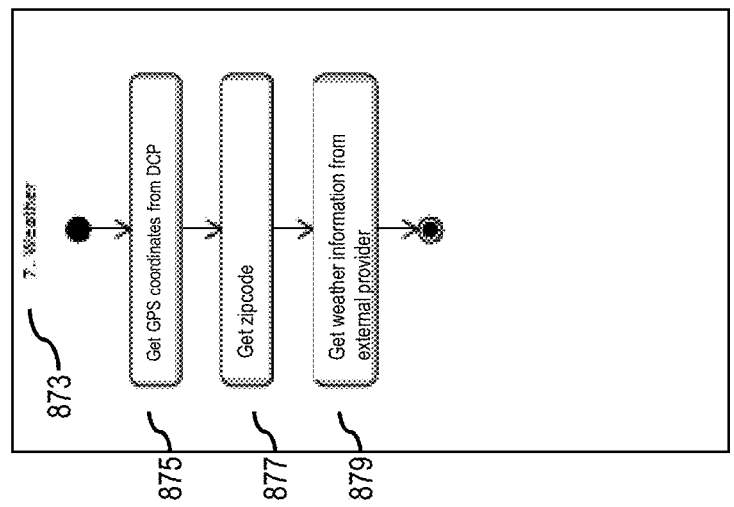

The FIG. 8G algorithm for comparing a recorded route to a calculated route for Weather (873) includes first retrieving GPS coordinates from a mass driving history database (875). Then a number of processes may be implemented including retrieving a zipcode (877) and weather information from an external provider (879). Once the data is processed the Weather calculations may be performed and saved.

Figure 9A:
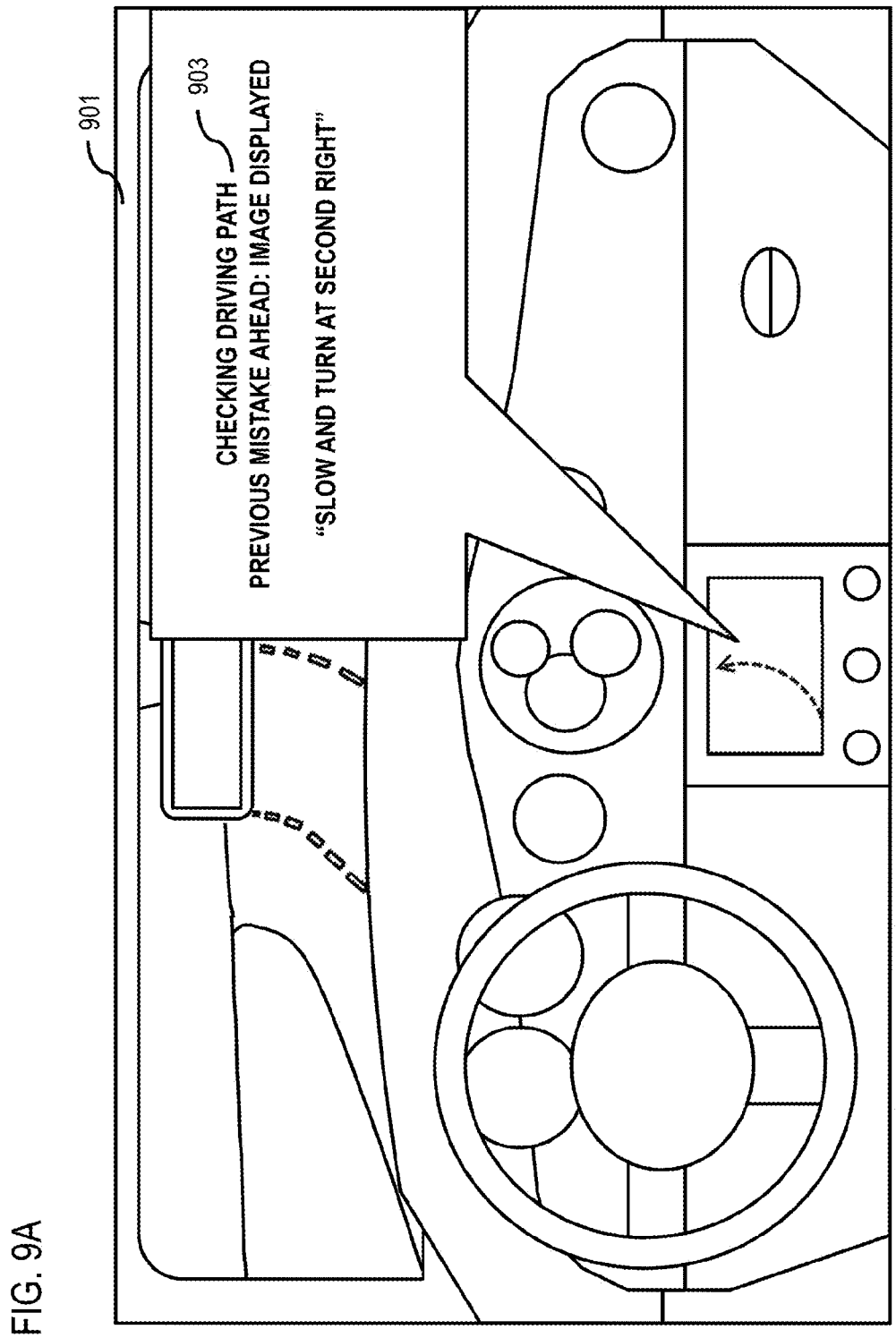
FIGS. 9A and 9B are user interface diagrams for the navigation guidance information in response to situations that may correspond with previous behaviors, according to one embodiment, according to various embodiments.
Figure 9B:
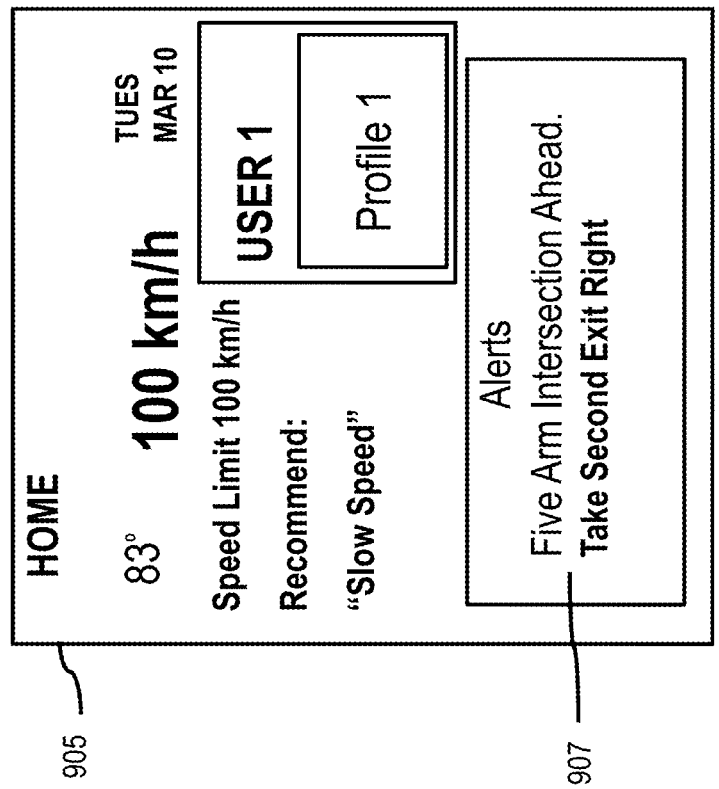

FIGS. 9A and 9B are user interface diagrams for the navigation guidance information in response to situations that may correspond with previous behaviors, according to various embodiments. FIG. 9A is a user interface diagram 901 for the navigation guidance information in response to situations that may correspond with previous behaviors, according to one embodiment. In the example of FIG. 9A, a user is driving along a calculated navigation route using the functions of the personalized routing platform 103. The personalized routing platform 103 processes the calculated route according to a previously built predictive model for predicting upcoming routing behaviors to be performed by the user. In this example, the predictive model results predict a mistake at an upcoming intersection where the user has made a previous mistake. The results are based on a route familiarity predictor indicating a previous mistake at the location. Based on the upcoming predicted mistake, the personalized routing platform 103 personalizes the routing instructions 903 presented to the user. In this case, the personalized routing platform 103 modifies a normal or default instruction to indicate to the user that the user has previously made a routing mistake up ahead and to "slow and turn at the second right" to avoid repeating the mistake.

FIG. 9B is a user interface diagram that represents a user equipment display when the present route location of the at least one user may correspond to one or more predicted behaviors, according to one embodiment. As shown, a user interface 905 may include one or more additional navigational guidance information (alerts) for situations where the at least one user (USER 1) is likely to commit a mistake. For example, if the user is approaching an intersection with five or more arms, the personalized routing platform 103 may predict a potential routing mistake based on, for instance, the route complexity predictor. Accordingly, the UI 905 can be personalized to include an alert 907 indicating the complexity of the upcoming intersection.

The processes described herein for providing personalized routing based on user routing mistakes may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide personalized routing based on user routing behaviors as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps for providing personalized routing based on user routing behaviors.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to for provide personalized routing based on user routing behaviors. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for providing personalized routing based on user routing behaviors. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing personalized routing based on user routing behaviors, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for providing personalized routing based on user routing behaviors to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004.

Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
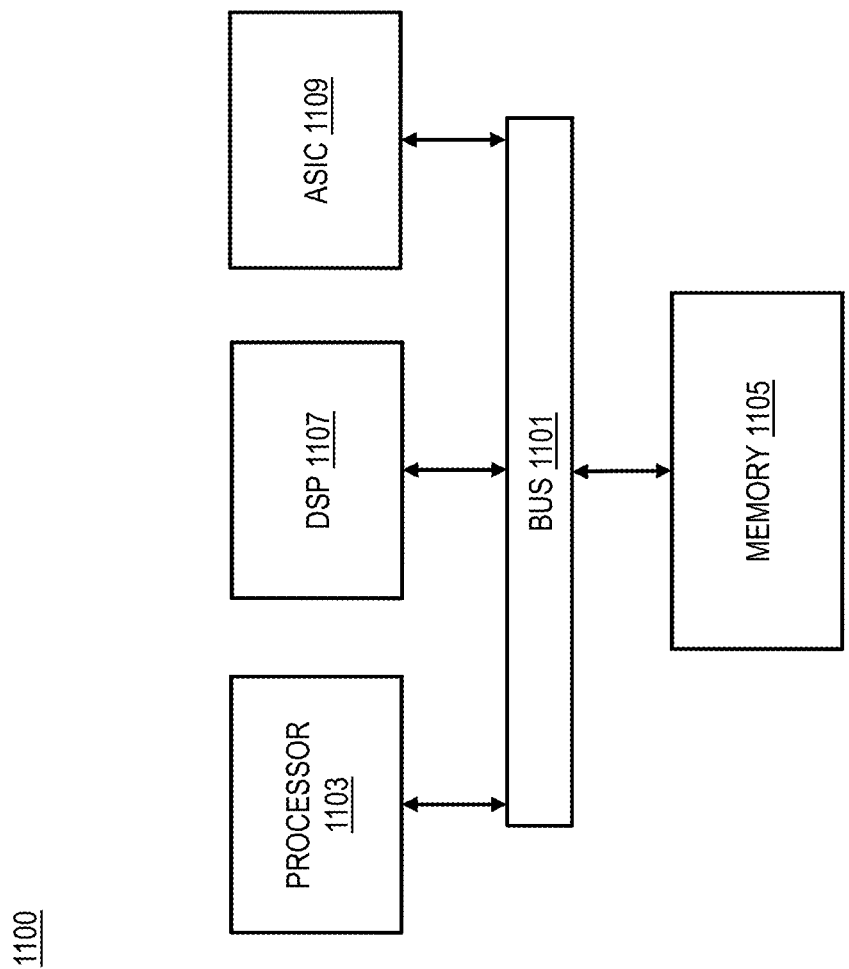
FIG. 11 is a diagram of a chip set that can be used to implement an embodiment of the invention.

FIG. 11 illustrates a chip set or chip 1100 upon which an embodiment of the invention may be implemented. Chip set 1100 is programmed to provide personalized routing based on user routing behaviors as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps for providing personalized routing based on user routing behaviors.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein for providing personalized routing based on user routing behaviors. The memory 1105 also stores the data associated with or generated by the execution of the inventive steps.

Figure 12:
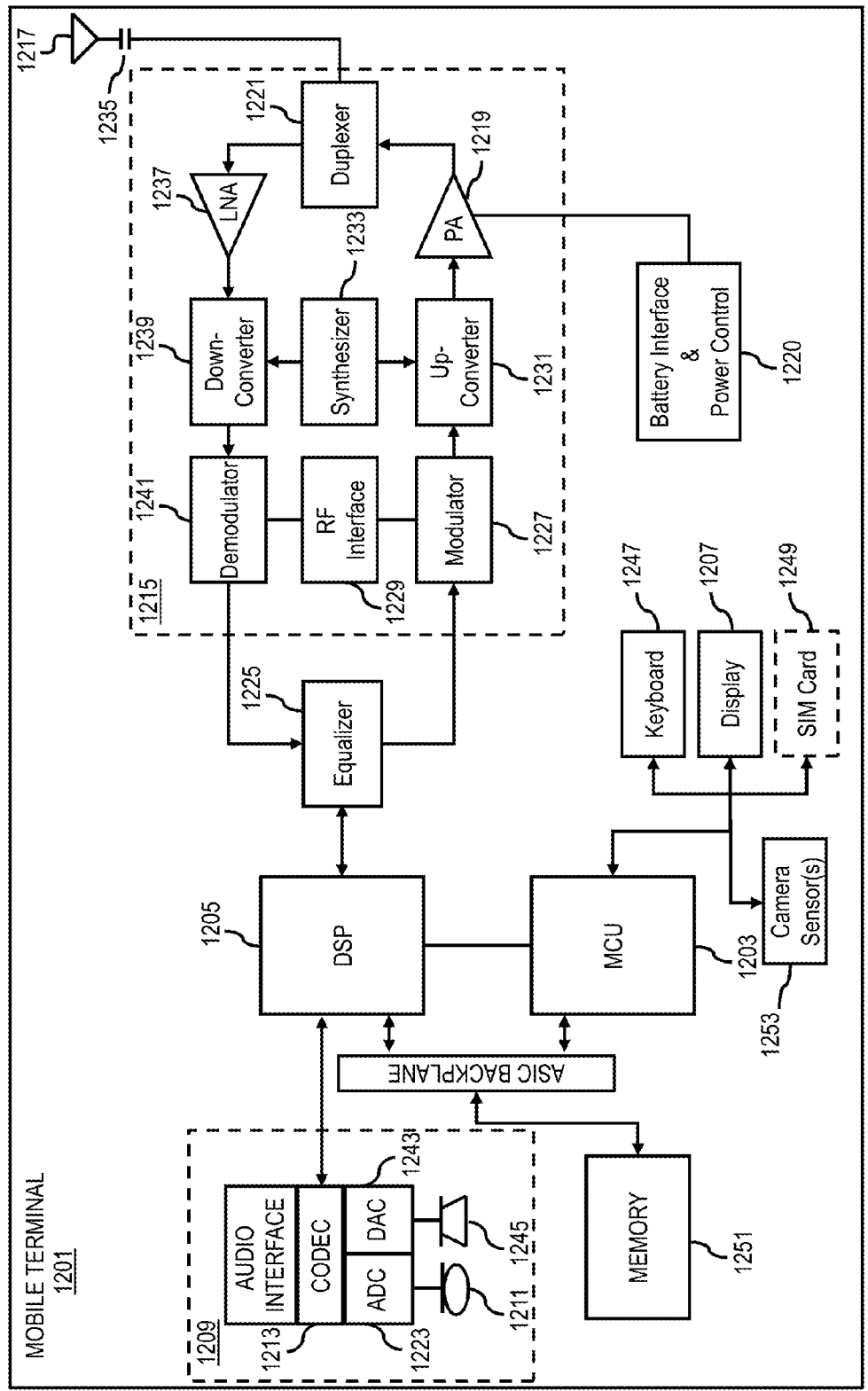
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing personalized routing based on user routing behaviors. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps for providing personalized routing based on user routing behaviors. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide personalized routing based on user routing behaviors. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining one or more previous behaviors made by at least one user traveling at least one calculated route, wherein the one or more previous behaviors include, at least in part, one or more routing mistakes, one or more behaviors correctly following routing instructions, or a combination thereof for the at least one calculated route;
    determining one or more predictor values for one or more predictors associated with the one or more previous behaviors, wherein the one or more predictor values include, at least in part, personalized data for the at least one user;
    creating at least one predictive model based, at least in part, on the one or more predictor values;

personalizing the at least one predictive model to the at least one user based, at least in part, on the personalized data; and determining weighting information for the one or more predictors based, at least in part, on the personalized data, wherein the at least one predictive model is used to predict one or more potential behaviors by the at least one user while traveling the at least one calculated route, at least one other route, or a combination thereof.

2. The method of claim 1, wherein the personalization of the at least one predictive model is further based, at least in part, on the weighting information.

3. The method of claim 1, further comprising:

receiving a request by the at least one user to generate at least one subsequent calculated route; and processing the at least one subsequent calculated route using the at least one predictive model to determine one or more predicted behaviors for the at least one user while traveling the at least one subsequent calculated route.

4. The method of claim 3, further comprising:

personalizing navigation guidance information to present to the at least one user while traveling the at least one subsequent calculated route based, at least in part, on the one or more predicted behaviors.

5. The method of claim 4, wherein the personalization of the navigation guidance information includes, at least part, varying a type of the navigation guidance information, a frequency of the navigation guidance information, a timing for presenting the navigation guidance information, or a combination thereof.

6. The method of claim 1, further comprising:

applying at least one supervised feature selection mechanism to classify the one or more predictors as useful for prediction, wherein the creation of the at least one predictive model is based, at least in part, on the one or more predictor values associated with the one or more predictors classified as useful for prediction.

7. The method of claim 1, further comprising:

determining predictive accuracy information for the at least one predictive model; and associating the at least one predictive model with at least one profile of the at least one user if the predictive accuracy information is above at least one threshold value.

8. The method of claim 1, further comprising:

determining the one or more routing mistakes, the one or more behaviors correctly following routing instructions, or a combination thereof by comparing at least one recorded route associated with the at least one user against the at least one calculated route.

9. The method of claim 1, wherein the one or more predictors include, at least in part, a route complexity predictor, a behavior commonality predictor, a route familiarity predictor, a routing sequence predictor, a user behavior predictor, a traffic predictor, a weather predictor, or a combination thereof.

10. The method of claim 1, wherein the one or more routing mistakes includes one or more driving deviations by the user between a recorded route and the calculated route.

11. An apparatus comprising:

at least one processor; and at least one memory including computer program code for one or more programs, the at least one memory and the computer program code configured to, with the at least one processor, cause the apparatus to perform at least the following:

determine one or more previous behaviors made by at least one user traveling at least one calculated route, wherein the one or more previous behaviors include, at least in part, one or more routing mistakes, one or more behaviors correctly following routing instructions, or a combination thereof for the at least one calculated route;

determine one or more predictor values for one or more predictors associated with the one or more previous behaviors, wherein the one or more predictor values include, at least in part, personalized data for the at least one user;

create at least one predictive model based, at least in part, on the one or more predictor values;

personalize the at least one predictive model to the at least one user based, at least in part, on the personalized data; and determine weighting information for the one or more predictors based, at least in part, on the personalized data, wherein the at least one predictive model is used to predict one or more potential behaviors by the at least one user while traveling the at least one calculated route, at least one other route, or a combination thereof.

12. The apparatus of claim 11, wherein the personalization of the at least one predictive model is further based, at least in part, on the weighting information.

13. The apparatus of claim 11, further comprising:

receive a request by the at least one user to generate at least one subsequent calculated route; and process the at least one subsequent calculated route using the at least one predictive model to determine one or more predicted behaviors for the at least one user while traveling the at least one subsequent calculated route.

14. The apparatus of claim 13, further comprising:

personalize navigation guidance information to present to the at least one user while traveling the at least one subsequent calculated route based, at least in part, on the one or more predicted behaviors.

15. The apparatus of claim 11, further comprising:

apply at least one supervised feature selection mechanism to classify the one or more predictors as useful for prediction, wherein the creation of the at least one predictive model is based, at least in part, on the one or more predictor values associated with the one or more predictors classified as useful for prediction.

16. The apparatus of claim 11, further comprising:

determine predictive accuracy information for the at least one predictive model; and associate the at least one predictive model with at least one profile of the at least one user if the predictive accuracy information is above at least one threshold value.

17. The apparatus of claim 11, wherein the one or more routing mistakes includes one or more driving deviations by the user between a recorded route and the calculated route.

18. A non-transitory computer-readable storage medium carrying one or more sequences of one or more instructions which, when executed by one or more processors, cause an apparatus to at least perform the following steps:

determining one or more previous behaviors made by at least one user traveling at least one calculated route, wherein the one or more previous behaviors include, at least in part, one or more routing mistakes, one or more behaviors correctly following routing instructions, or a combination thereof for the at least one calculated route;

determining one or more predictor values for one or more predictors associated with the one or more previous behaviors, wherein the one or more predictor values include, at least in part, personalized data for the at least one user;

creating at least one predictive model based, at least in part, on the one or more predictor values;

personalizing the at least one predictive model to the at least one user based, at least in part, on the personalized data; and determining weighting information for the one or more predictors based, at least in part, on the personalized data, wherein the at least one predictive model is used to predict one or more potential behaviors by the at least one user while traveling the at least one calculated route, at least one other route, or a combination thereof.

19. The non-transitory computer-readable storage medium of claim 18,
wherein the personalization of the at least one predictive model is further based, at least in part, on the weighting information.

20. The non-transitory computer-readable storage medium of claim 18, wherein the one or more routing mistakes includes one or more driving deviations by the user between a recorded route and the calculated route.

* * * * *